(12) United States Patent
Okamoto et al.

(10) Patent No.: US 6,356,033 B1
(45) Date of Patent: Mar. 12, 2002

(54) LIGHT SOURCE USING DIELECTRIC BARRIER DISCHARGE LAMP, AND POWER SUPPLY

(75) Inventors: Masashi Okamoto, Akashi; Takashi Asahina, Takasago; Masaki Yoshioka, Himeji; Takafumi Mizojiri, Himeji; Kenichi Hirose, Himeji, all of (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/423,312

(22) PCT Filed: Mar. 4, 1999

(86) PCT No.: PCT/JP99/01040

§ 371 Date: Feb. 14, 2000

§ 102(e) Date: Feb. 14, 2000

(87) PCT Pub. No.: WO99/46963

PCT Pub. Date: Sep. 16, 1999

(30) Foreign Application Priority Data

Mar. 12, 1998 (JP) .......................................... 10-078529

(51) Int. Cl.[7] .............................................. H05B 37/02
(52) U.S. Cl. ................... 315/209 R; 315/206; 315/224; 315/248
(58) Field of Search ................................ 315/224, 248, 315/246, 205, 206, 209 R

(56) References Cited

U.S. PATENT DOCUMENTS 4,042,856 A * 8/1977 Steigerwald ................ 315/246
4,983,881 A    1/1991 Eliasson et al. ............. 315/246
5,936,358 A * 8/1999 Okamoto et al. ............ 315/248

FOREIGN PATENT DOCUMENTS

| EP | 0 781 078 | 6/1997 |
|---|---|---|
| JP | 1-243363 | 9/1989 |
| JP | 6-163006 | 6/1994 |
| JP | 8-31585 | 2/1996 |
| JP | 9-199285 | 7/1997 |
| JP | 10-223384 | 8/1998 |
| WO | 99/05892 | 2/1999 |

* cited by examiner

*Primary Examiner*—David Vu
(74) *Attorney, Agent, or Firm*—Nixon Peabody LLP; David S. Safran

(57) ABSTRACT

A dielectric-barrier discharge lamp light source with a dielectric-barrier discharge lamp, the light source including a discharge plasma space filled with a discharge gas in which excimer molecules are formed by dielectric-barrier discharge, two electrodes adapted to induce a discharge phenomenon in the discharge gas, at least one of the two electrodes being separated from the discharge gas by a dielectric, and a power supply for impressing a substantially cyclical, high-voltage alternating current on the two electrodes of the dielectric-barrier discharge lamp in a manner that when the power supply completes a discharge in the dielectric-barrier discharge lamp and the voltage impressed on the dielectric-barrier discharge lamp changes for a subsequent discharge, there is a period of gradual change in a lamp voltage waveform (Vs(t)) before reaching a voltage required for beginning of the subsequent discharge, wherein subsequent to the period of gradual change, the voltage impressed on the dielectric-barrier discharge lamp by the power supply changes sharply.

6 Claims, 9 Drawing Sheets

LIGHT SOURCE USING DIELECTRIC BARRIER DISCHARGE LAMP, AND POWER SUPPLY

BACKGROUND OF THE INVENTION

1. Field of the Invention

This invention concerns a dielectric-barrier discharge lamp light source and power supply that incorporates what is called a dielectric-barrier discharge lamp, a type of discharge lamp that uses light radiated by excimer molecules formed by dielectric-barrier discharge.

2. Description of the Related Art

Technology related to this invention is found in, for example, U.S. Pat. No. 4,983,881 (Japanese Kokai Patent document H2-7353) which deals with a dielectric-barrier discharge lamp. This document describes a radiator in which a discharge vessel is filled with a discharge gas that can form excimer molecules, the excimer molecules being formed by means of dielectric-barrier discharge, and light being radiated from the excimer molecules.

The dielectric-barrier discharge lamp described above and a light source that incorporates such a lamp has a wide range of potential applications because of a number of advantages not found in conventional low-voltage mercury discharge lamps or high-voltage arc discharge lamps. In particular, with the growing interest in the problem of environmental pollution in recent years, one of the most important applications is non-polluting treatment of materials by means of a photochemical reaction using ultraviolet light. There is, accordingly, extremely great interest in increasing the power of dielectric-barrier discharge lamp light sources.

However, there have been a number of major problems that this conventional technology has been unable to resolve. The first of the problems is the necessity of improving the light efficiency of lamps in order to meet the high interest in reduced power consumption, reduced generation of heat by the lamp, and improved lamp longevity.

The second problem is the need to popularize the use of superior ultraviolet radiation technology by making it more economical.

These issues are becoming increasingly important as the light sources increase in output, and thus, power consumption.

The conditions for improvement of the light efficiency of lamps are explained below. The dielectric-barrier discharge lamp (2) has one or two dielectrics (6, 7) sandwiching a discharge plasma space (3) between electrodes (4, 5). FIG. 1 shows a dielectric-barrier discharge lamp with two dielectrics (6, 7).

When the dielectric-barrier discharge lamp (2) is turned on, a high-frequency, alternating-current voltage of, for example, 10 kHz to 200 kHz and 2 kV to 10 kV from the power supply is impressed on the two electrodes (4, 5). Because the dielectrics (6, 7) intervene between the discharge plasma space (3) and the electrodes, current does not flow directly from the electrodes (4, 5) to the discharge plasma space (3), and the dielectrics (6, 7) exhibit a condenser effect with respect to the flow of current. That is, equivalent charges of opposite sign to those between the surfaces of the electrodes (4, 5) are induced by the polarization of the dielectric, and the discharge occurs between the surfaces of the dielectrics (6, 7) that face across the discharge plasma space (3).

Because little current flows along the surfaces of the dielectrics (6, 7) that face across the discharge plasma space (3), the charge that is induced on the surfaces of the dielectrics (6, 7) that face across the discharge plasma space (3) in the area where the discharge occurred is neutralized by the charge shifted by the discharge, and the electric field in the discharge plasma space (3) is reduced, so that the discharge current stops even if the voltage impressed on the electrodes (4, 5) continues. However, the discharge current is sustained if the voltage impressed on the electrodes (4, 5) is further increased. After one discharge, there is no further discharge in the area where the discharge occurred until the polarity of the voltage impressed on the electrodes (4, 5) is reversed.

In the case of a dielectric-barrier discharge lamp filled with xenon gas, for example, the xenon gas is separated by the discharge into ions and electrons, to form xenon plasma. Within this plasma, the xenon that is excited to a certain energy level bonds, and excimer molecules are formed. Xenon excimers decay after the passage of a given lifespan, and the energy released at that time is emitted as photons with a vacuum ultraviolet wavelength. In order for dielectric-barrier discharge lamps to function efficiently as vacuum ultraviolet light sources, it is necessary to form these excimer molecules efficiently.

The major factor preventing the efficient formation of excimer molecules is the excitation of the discharge plasma to energy levels that do not contribute to the formation of excimer molecules.

The electron movement of discharge plasma before and after discharge commences is collective, and energy is high but the temperature is low. In this state, there is a high probability that the discharge plasma will transition to the resonant state necessary to formation of excimer molecules. As the discharge time lengthens, however, the electron movement of the plasma gradually becomes heated; that is, it reaches a heat equilibrium known as the Maxwell-Boltzmann distribution. Then, the plasma temperature increases and there is a greater probability of transition to a state of high excitation where excimer molecules cannot form.

Moreover, if excimer molecules do form, subsequent discharge sometimes breaks down the excimer molecules before they naturally decay and emit the desired photons after the passage of their lifespan. Actually, in the case of xenon excimers, a period of about 1 $\mu$s is needed from the beginning of discharge until a vacuum ultraviolet wavelength photon is emitted; subsequent discharge or re-discharge within that period reduces the efficiency of excimer light generation.

In other words, it is known to be most important to keep the subsequent discharge energy as low as possible once discharge has begun.

Even if the discharge time is short, the probability of transition to the same high-excitation state will increase if too much energy is injected during the discharge period. Plasma that has transitioned to a high-excitation state alleviates that state by emitting infrared radiation and just raises the temperature of the lamp without contributing to excimer light generation.

That is, it is necessary to drive the discharge so as to suppress the excitation of discharge plasma to an energy level that does not contribute to the formation of excimer molecules.

Japanese kokai patent document H1-243363 proposes achievement of high-efficiency excimer light generation by any means of pulse discharge, including dielectric-barrier discharge. This proposal follows the condition that, once discharge has begun, the energy of the subsequent discharge is kept as low as possible. However, the description of this proposal deals with which parameters to adjust to make excimer light generation efficient; it gives no concrete indication of the effective conditions of the parameter values or of how to constitute a power supply that can realize those conditions.

Among the lamp voltage waveforms that have the potential to satisfy the conditions for discharge that will suppress the excitation of discharge plasma to an energy level that does not contribute to the formation of excimer molecules, as described above, one of the simplest candidates is thought to be a short waveform of optimal amplitude. There are, in fact, improvement proposals, for drive waveforms for fluorescent lamps using dielectric-barrier discharge, such as Japanese kokai patent document H6-163006. That states that the brightness of fluorescent lamps is increased by driving them with a stream of short with positive polarity, or with alternating current with a short waveform. Regarding the frequency and duty cycle of the stream of short pulses or the short-waveform current, it records experimental results on changes of brightness relative to changes in the voltage impressed, and explains that efficiency is improved over the conventional sine-wave drive.

However, this sort of simple waveform has a major problem when it comes to actually putting together a power supply. This problem arises from the fact that there is an impulsive flow of current only at the instant of the rise or fall of the voltage impressed on the lamp because, as stated above, the dielectric (6, 7) of the dielectric-barrier discharge lamp is a structure in which current flows because it acts as a condenser and basically is a condenser. This situation is illustrated in FIG. 3, a typical representation of the lamp voltage waveform (Vs(t)) and the lamp current waveform (Is(t)).

Normally, power supplies that generate a high-voltage alternating current to impress on dielectric-barrier discharge lamps use inverter circuits and step-up transformers, in which the current that flows through the primary winding increases in proportion to the ratio by which the voltage is stepped up from the primary side to the secondary side. For example, if the peak current value for the lamp current waveform is 3 A and the step-up transformer has a step-up ratio of 20, the peak current value flowing through the primary winding will actually reach 60 A.

That current value is not impossible to achieve, but an inverter circuit switch element that can withstand that current will be expensive, making it difficult to resolve the second problem mentioned above. This peak current value will of course vary, depending on the rating of the dielectric-barrier discharge lamp to be lit and the structure of the step-up transformer, but in any case, it is necessary to make that value a small one. The proposal in Japanese kokai patent document H6-163006, mentioned above, does not state specific guidelines for resolving this problem.

SUMMARY OF THE INVENTION

This invention provides a dielectric-barrier discharge lamp light source and power supply that simultaneously resolves both the first problem stated above, which is the problem of improving the lamp's lighting efficiency to meet demands for reduced power consumption, reduced lamp heat and longer lamp life, and the second problem stated above, which is the problem of making the lamp more economical to popularize the use of superior ultraviolet light.

In order to solve the problems stated above, the dielectric-barrier discharge lamp light source of this invention has the following structure.

(1). A dielectric-barrier discharge lamp light source with a dielectric-barrier discharge lamp (2) comprising a discharge plasma space (3) filled with a discharge gas in which excimer molecules are formed by dielectric-barrier discharge, and two electrodes (4, 5) to induce a discharge phenomenon in the discharge gas, at least one of which is separated from the discharge gas by dielectrics (6, 7); and with a power supply to impress a roughly cyclical, high-voltage alternating current on the electrodes (4, 5) of the dielectric-barrier discharge lamp; such that when the power supply (1) completed one discharge in the dielectric-barrier discharge lamp (2) and the voltage impressed on the lamp changes toward the next discharge, there is a period of gradual change in the lamp voltage waveform (Vs(t)) before reaching the voltage for the beginning of the next effective discharge (+Ei, −Ei), following which the voltage changes sharply.

(2). Also, a dielectric-barrier discharge lamp light source as described above, characterized by having a voltage VA when one discharge is completed and a voltage VB when the next discharge is completed with a voltage differential $\Delta Vx$ between, as well as a voltage differential $\Delta Vy$ between voltage VA and the voltage VF at the end of the period of gradual change of the voltage impressed on the lamp, satisfying the condition 0.3 $\alpha \Delta Vy/\Delta Vx$ $\alpha 0.9$.

(3). Also, a dielectric-barrier discharge lamp light source power supply for the dielectric-barrier discharge lamp (2), which has a discharge plasma space (3) filled with discharge gas in which excimer molecules are formed by dielectric-barrier discharge, and two electrodes (4, 5) to induce a discharge phenomenon in the discharge gas, at least one of which is separated from the discharge gas by dielectrics (6, 7), which power supply impresses a roughly cyclical, high-voltage alternating current on the electrodes (4, 5) of the lamp (2); the power supply comprising a chopper circuit (26) that outputs the voltage of a DC power supply (12) stepped up to a higher DC voltage, a step-up transformer (10) that produces a high-voltage alternating current on its secondary side, and an inverter circuit (13) to convert the output of the chopper circuit (26) to alternating current and feed it to the primary side of the step-up transformer (10); such that the gate signal (Gc) controlling the switch element of the chopper circuit (26) is generated in synchronization with the gate signals (GU, GL) controlling the switch elements of the inverter circuit (13).

(4). Also, a power supply (1) which is the dielectric-barrier discharge lamp light source power supply described above.

DETAILED DESCRIPTION OF THE INVENTION

Figure 4A:
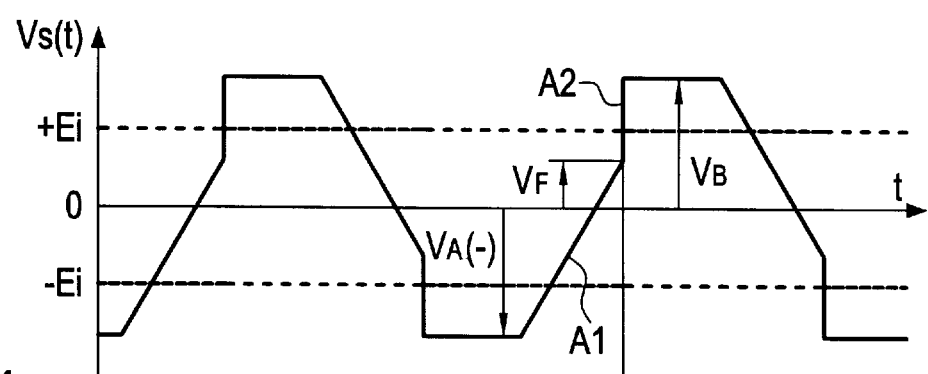
FIG. 4 is a diagram explaining the concept of the voltage waveform impressed on the lamp of the dielectric-barrier discharge lamp light source in accordance with one embodiment of the present invention.
Figure 4B:
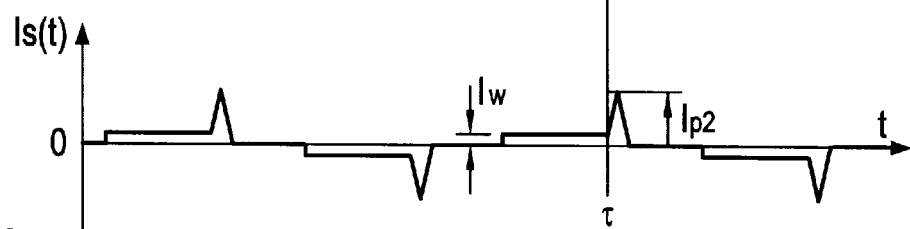

A configuration for implementation of the invention is explained using FIG. 4.

In order to succeed in efficiently forming excimer molecules by suppressing the excitation of the discharge plasma to energy levels that do not contribute to the formation of excimer molecules, it is best to raise the voltage impressed on the lamp, and when discharge begins on reaching the voltage where discharge begins, to terminate the discharge as quickly as possible.

Figure 1:
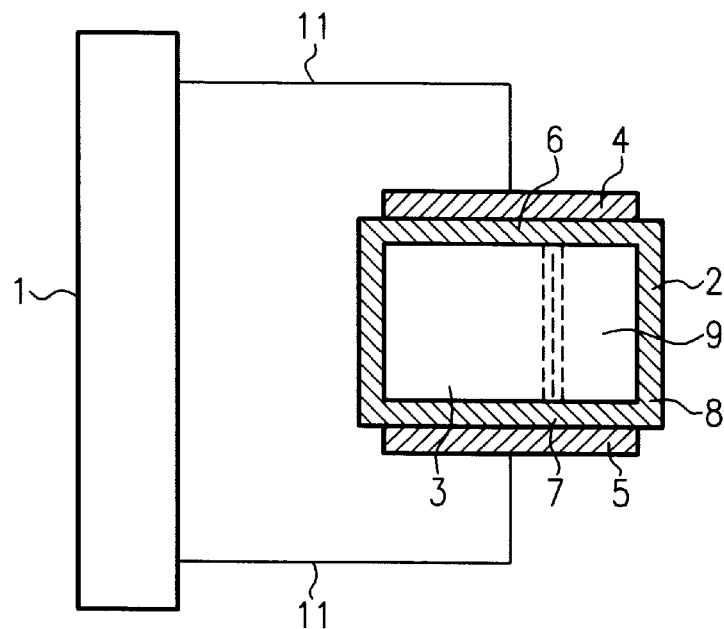
FIG. 1 shows a dielectric-barrier discharge lamp having two dielectrics.
Figure 2:
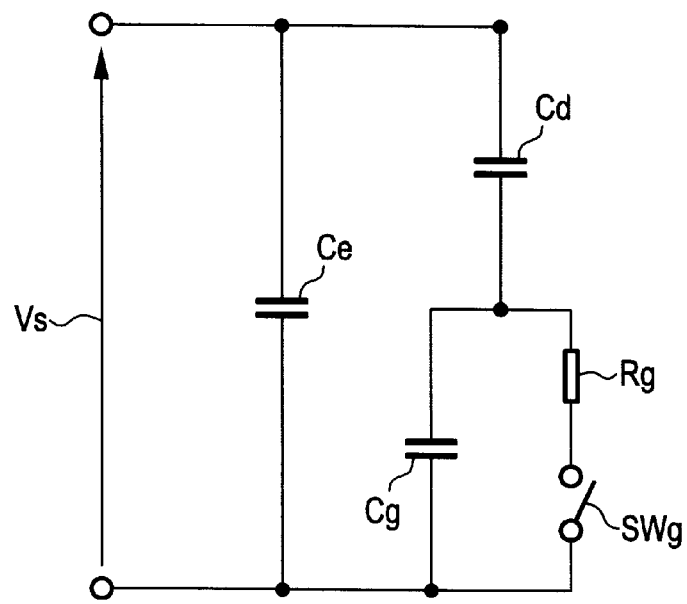
FIG. 2 shows the equivalent circuit of the dielectric-barrier discharge lamp.

The action of the electrical circuitry of the dielectric-barrier discharge lamp is modeled in FIG. 2: the discharge path (9) of discharge plasma space (3) shown in FIG. 1 can be thought of as being connected in series with the discharge resister (Rg) and the discharge switch (Swg). Moreover, there is dielectric (6, 7) between the discharge plasma space (3) and the electrodes (4, 5) in the dielectric-barrier discharge lamp (2); electrically this functions as a condenser. When there are two dielectrics, however, the condensers formed by the individual dielectrics can be thought of as joined in series to form a single condenser (Cd).

Because the condenser (Cd) formed by this dielectric is inserted in series with respect to the discharge plasma space (3), the discharge current flows in the dielectric-barrier discharge lamp (2) only when the voltage impressed on the lamp changes or immediately after the change.

The discharge plasma space (3) itself forms a condenser (Cg), and because the energy stored in this condenser (Cg) is used up if discharge begins, the power supply does not feed the dielectric-barrier discharge lamp (2) more current than is necessary after the discharge begins.

The voltage at which discharge begins is determined almost automatically once the gas pressure and the gap of the discharge plasma space are determined. Because the capacitance of the condenser (Cg) formed by the discharge plasma space is determined by the gap of the discharge plasma space, the minimum energy supplied to the plasma from the beginning to the end of one discharge is the energy of a full discharge of the charge stored in the condenser (Cg) formed by the discharge plasma space; this is determined by the structure of the lamp. Suppression of the excitation of discharge plasma to an energy level that does not contribute to the formation of excimer molecules, as described above, is best achieved in the conditions for discharge of this minimum energy.

However, the conditions for discharge of this minimum energy involve the problem that uneven discharge within a single lamp can easily result from discrepancies in the location of the discharge plasma space gap within the lamp.

Consequently, in order to provide a practical light source with the capability for uniform discharge across the full surface of the dielectric-barrier discharge lamp, it is necessary to augment the energy injected into the lamp beyond the minimum energy discharge conditions mentioned above, and to establish an acceptable range for reduction of the efficiency of excimer light generation due to the augmentation of energy injected into the lamp.

The augmented energy injected into the lamp naturally has to be injected with timing that will not cause reduction of the efficiency of excimer light generation. It is therefore necessary that the injection of energy be close to the timing for full discharge of the charge stored in the condenser (Cg) formed by the discharge plasma space, preferably overlapping. With regard to the speed of change of the voltage impressed on the lamp, therefore, it is necessary to change sharply, in the period from just before the discharge begins until reaching the peak voltage value after discharge begins, so as not to reduce the efficiency of excimer light generation.

However, there are no constraints on the waveform of the voltage impressed on the lamp in the period from completion of one discharge to the beginning of the next discharge. That is, after the discharge is completed there is no necessity for a rapid change in the voltage impressed on the lamp from the time the polarity of the lamp voltage switches to the opposite sign until just before the next discharge begins. That is because there is no discharge until the voltage of the discharge plasma space (3) reaches the voltage at which discharge begins. Thus, if there is no discharge, the problem of uneven discharge within a single lamp resulting from discrepancies in the location of the discharge plasma space gap within the lamp will tend not to occur.

In other words, the rise and fall of the voltage impressed on the lamp can be slow prior to the beginning of discharge, as long as it is rapid on exceeding the voltage at which discharge begins. This situation is modeled in FIG. 4.

In FIG. 4, the waveform of the voltage impressed on the lamp (Vs(t)) has a value less than the rising voltage at which discharge begins (+Ei) when changing from the negative lamp voltage (VA) to the positive lamp voltage (VB), and changes gradually during the period (A1) before reaching the start value for the rapid change of lamp voltage (VF). It changes rapidly during the period (A2) from the start value for the rapid change of lamp voltage (VF) to the positive lamp voltage (VB). This can be seen by comparing FIG. 4 with the peak current values (Ip1, Ip2) of the lamp current waveforn (Is(t)) in the approximate model analysis in FIG. 3.

FIG. 2 is used as a circuit model illustrating the dielectric-barrier discharge lamp. A typical implementation has the values shown below for negative lamp voltage VA, positive lamp voltage VB, start value for rapid change of lamp voltage VF, capacitance Cd of the condenser formed by the dielectric (Cd), capacitance Cg of the condenser formed by the discharge plasma space (Cg), and transient capacitance Ce resulting from the step-up transformer (10), the dielectric-barrier discharge lamp and their interconnection.

$$VA=-2500\ V \quad \text{formula 4}$$

$$VB=+2500\ V \quad \text{formula 5}$$

$$VF=+2000\ V \quad \text{formula 6}$$

$$Cg=35\ pF \quad \text{formula 7}$$

$$Cd=220\ pF \quad \text{formula 8}$$

$$Cg=100\ pF \quad \text{formula 9}$$

The state of the lamp voltage VA will be considered first. Immediately after discharge, the charge stored in the discharge plasma space capacitance Cg of the discharge plasma space (3) is short-circuited by the discharge and almost completely neutralized, so that the voltage of discharge plasma space capacitance Cg approximates 0 V. In this state, the stored charge QdA of dielectric capacitance Cd, the stored charge QgA of discharge plasma space capacitance Cg and the stored charge QeA of transient capacitance Ce are as shown below.

$$QdA=Cd\cdot VA \quad \text{formula 10}$$

$$QgA=0 \quad \text{formula 11}$$

$$QeA=Ce\cdot VA \quad \text{formula 12}$$

Next, the change of lamp voltage from VA to VB will be considered. In this case, the charge ΔQLAB flowing to the series connection of dielectric capacitance Cd and discharge plasma space capacitance Cg and the charge ΔQsAB flowing to transient capacitance Ce are as shown below.

$$\Delta QLAB=(Cd\cdot Cg/(Cd+Cg))(VB-VA) \quad \text{formula 13}$$

$$\Delta QsAB=Ce(VB-VA) \quad \text{formula 14}$$

Accordingly, the charge ΔQAB flowing from the power supply in the course of the change of lamp voltage is found by combining those two.

$$\Delta QAB=(Cd\cdot Cg/(Cd+Cg)+Ce)(VB-VA) \quad \text{formula 15}$$

Now, the voltage VdB of dielectric capacitance Cd at this time can be calculated by applying equations 10 and 13 to the formula VdB=(QdA+ΔQLAB)/Cd.

$$VdB=(Cd\cdot VB-Cg\cdot Va)/(Cd+Cg) \quad \text{formula 16}$$

As discharge occurs, as described above, the charge stored in the discharge plasma space capacitance Cg of the discharge plasma space (3) is short-circuited and almost completely neutralized by the discharge; the discharge plasma space capacitance Cg approximates 0 V, and so the lamp voltage VB is impressed entirely on the dielectric capacitance Cd. Because the voltage of the dielectric capacitance Cd prior to discharge was VdB, the charge ΔQD flowing from the power supply in the process of discharge can be determined, based on the difference, from the formula ΔQD=Cd(VB+VdB), and calculated by applying formula 16 to that.

$$\Delta QD=(Cd^2/(Cd+Cg))(VB-VA) \quad \text{formula 17}$$

Figure 3A:
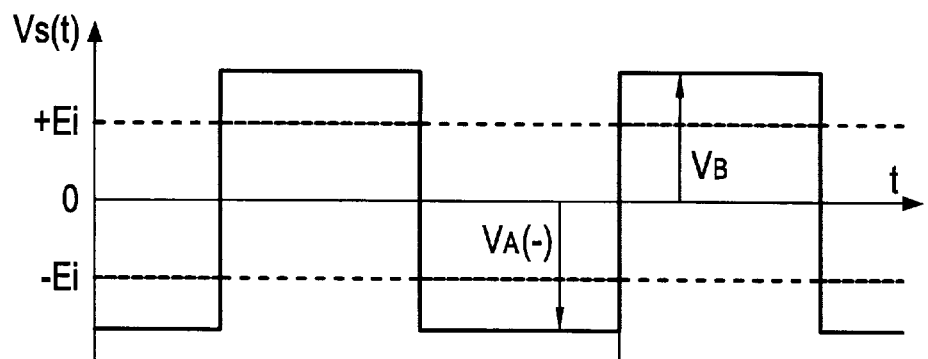
FIG. 3 is a diagram explaining the concept of a short waveform voltage impressed on the lamp.
Figure 3B:

The results above will be applied to the lamp voltage waveform in FIG. 3. In the case of the lamp voltage waveform in FIG. 3, there is a sharp transition from negative lamp voltage VA to positive lamp voltage VB. Therefore in the short period Δt at the instant when discharge begins (τ), the power supply has to output the charge ΔQ1 which combines the ΔQAB of formula 15 and the ΔQD of formula 17.

$$\Delta Q1=(Cd+Ce)(VB-VA) \quad \text{formula 18}$$

The average current value Im1 output by the power supply at this time is found by dividing ΔQ1 by Δt.

$$Im1=\Delta Q1/\Delta t \quad \text{formula 19}$$

By applying the real values of formulas 4 through 9 to this and generalizing the elapsed time Δt as $$\Delta t=1\ \mu s \quad \text{formula 20}$$

and considering the peak current value to be double the average current value, the peak current value Ip1 of the power supply in the case of the lamp voltage waveform shown in FIG. 3 becomes $$Ip1=2\cdot Im1=3.2\ A \quad \text{formula 21}$$

Next, the same calculations will be applied to the lamp voltage waveform in FIG. 4. In the case of the lamp voltage waveform in FIG. 4, there is a gradual transition from negative lamp voltage VA to lamp voltage VF where a sharp increase begins. Charge ΔQAF which flows from the power supply during this period of changing lamp voltage can be found by substituting VF for VB in formula 15.

$$\Delta QAF=(Cd\cdot Cg/(Cd+Cg)+Ce)(VF-VA) \quad \text{formula 22}$$

On the other hand, there is a rapid transition from lamp voltage VF where a sharp increase begins to positive lamp voltage VB, and discharge occurs. Charge ΔQFB which flows from the power supply during this period of changing lamp voltage is the difference between ΔQAB in formula 15 and ΔQAF in formula 22.

$$\Delta QFB=(Cd\cdot Cg/(Cd+Cg)+Ce)(VB-VF) \quad \text{formula 23}$$

Since the charge ΔQD that flows from the power supply during the course of the discharge is the same as in formula 17, the charge that the power supply has to output in the short period Δt at the instant when discharge begins (τ) is the charge ΔQ2 which combines the ΔQFB of formula 23 and the ΔQD of formula 17: ΔQ2=ΔQFB+ΔQD.

$$\Delta Q2=(Cd\cdot Cg/(Cd+Cg)+Ce)(VB-VF)+(Cd^2/(Cd+Cg))(VB-VA) \quad \text{formula 24}$$

As in the case of FIG. 3, the average current value Im2 output by the power supply at this time is found by dividing ΔQ2 by Δt.

$$Im2=\Delta Q2/\Delta t \quad \text{formula 25}$$

Similarly, by applying the real values of formulas 4 through 9 to this and using the value from formula 20 for the elapsed time Δt, and by considering the peak current value to be double the average current value, the peak current value Ip2 of the power supply in the case of the lamp voltage waveform shown in FIG. 4 becomes $$Ip2=2\approx Im1=2.0\ A. \quad \text{formula 26}$$

Comparing formula 26 with formula 21, it can be seen that the peak current value Ip2 in the case of the lamp voltage waveform shown in FIG. 4 is 63% lower than the peak current value Ip1 in the case of the lamp voltage waveform shown in FIG. 3. The effect of reducing the peak current value in the case of the lamp voltage waveform shown in FIG. 4 is the result of a very low charging current flow Iw over a long period while the lamp voltage changed gradually from VA to VF, in preparation for a sharp shift of charge during discharge. The effect of reducing the peak current value will naturally change if different values are used in formulas 4 through 9.

It can be seen, as a result, that there is an effect in reducing the peak current value of the switching element in the inverter circuit, thus resolving the second problem described above.

Moreover, because the lamp voltage (VF) at the beginning of the sharp change is lower than the rising voltage to begin discharge (+Ei), the speed of the change of lamp voltage from just before discharge begins to the peak voltage after discharge begins is such that it is possible to sustain the necessary sharp change without reducing the efficiency of excimer light generation. Thus, there is also an effect in resolving the first problem described above.

Now, applying formulas 4 through 6 yields $$\Delta Vy/\Delta Vx=0.9 \qquad \text{formula 27}$$

The lamp voltage VF at the beginning of the sharp change must be set so that the rising voltage to begin discharge (+Ei) is between VF and the positive lamp voltage (VB). In the case of $\Delta Vy/\Delta Vx$ in formula 27, the voltage at beginning of discharge has to be located within a range of 10% of the full amplitude of the lamp voltage waveform, and so, it may be difficult to set in light sources with power supplies that are not too stable. In such cases, $\Delta Vy/\Delta Vx$ can be set below 0.8, or below 0.7 depending on how poor the stability is.

The larger $\Delta Vy/\Delta Vx$ is, the greater the effect of reducing the peak current value will be. If, among formulas 4 through 9, the value of formula 6 is changed to $$VF=-1000 \text{ V} \qquad \text{formula 28}$$

then $\Delta Vy/\Delta Vx$ will correspond to a value of 0.3, and using the same calculations for peak current value Ip2 in that case yields $$Ip2=2.8 \text{ A}. \qquad \text{formula 29}$$

Compared with the peak current value Ip1 for the lamp voltage waveform in FIG. 3, the peak current value is reduced by about 88%. Accordingly, the value $\Delta Vy/\Delta Vx$ is preferably set at 0.4 or greater; if a marked reduction is desired, a value above 0.5 is beneficial.

In connection with that, if $\Delta Vy/\Delta Vx$ corresponds to the value 0.5 and $$VF=0 \text{ V} \qquad \text{formula 30}$$

then the peak current value Ip2 will be $$Ip2=2.6 \text{ A} \qquad \text{formula 31}$$

In other words, the peak current value is reduced about 81% from the peak current value Ip1 in the case of the lamp voltage waveform shown in FIG. 3.

With regard to the sharpness of the rise or fall of the lamp voltage waveform (Vs(T)) after the lamp voltage VF at the beginning of the sharp change from the period just before discharge begins until the peak voltage value is reached after discharge begins, it should be sharp enough to prevent a decline in the brightness of excimer light generation. In concrete terms, it is normally adequately effective if the period from the voltage (VF) at the beginning of the rapid change of lamp voltage until the maximum voltage is reached is within a range from 10 ns to 1 $\mu$s.

With regard to the gradual rise or fall of the lamp voltage waveform (Vs(t)) until the lamp voltage VF at the beginning of the sharp change is reached, on the other hand, the output current of the power supply during this period can be as small as desired relative to the current output capacity of the power supply. The $\Delta QAF$ of formula 22 is the charge output by the power supply in the period that the lamp voltage changes from the negative lamp voltage (VA) to the voltage (VF) at the beginning of the sharp change, and so the output current during this period can be estimated by dividing $\Delta QAF$ by the length of that period. In the event that the lamp voltage waveform (Vs(t)) is symmetrical with respect to polarity reversals, if the lamp voltage waveform has a cycle length T and period of gradual change occupies proportion $a$ of the cycle, then the average current iAF during the period of gradual change from the negative lamp voltage (VA) to the value at the beginning of the rapid change of lamp voltage (VF) is found by the following formula.

$$IAF=2\Delta QAF/(\alpha T) \qquad \text{formula 32}$$

Now, the reason for multiplying by the coefficient 2 on the right side of formula 32 is that the phenomenon occurs every half cycle. In the examples given in formulas 4 through 9, assuming that cycle length T of the lamp voltage waveform shown in FIG. 4 and proportion $\alpha$ of the cycle occupied by the period of gradual change are $$T=20 \text{ }\mu s \text{ (50 kHz)} \qquad \text{formula 33}$$

$$\alpha=50\% \qquad \text{formula 34}$$

then the average current flow iAF of the period of gradual change can be estimated as follows.

$$IAF=0.12 \text{ A} \qquad \text{formula 35}$$

This value is small enough, only 6% greater than the peak current value Ip2 of formula 26. It can be seen from formula 32 that the average current flow iAF during the period of gradual change is inversely proportional to the proportion $\alpha$ of the cycle occupied by the period of gradual change, and even the 10% corresponding to 1 part in 5 is quite practical. But if $\alpha$ is larger, for example 90%, the average current flow iAf of the period of gradual change is even smaller, and thus more beneficial. Consequently, the proportion ($\alpha$) of each cycle occupied by the period of gradual change can be freely chosen within the range from 10% to 90%.

The transient capacitance Ce is normally an element produced by unnecessary peak current flow, and it cannot be completely eliminated, whatever efforts may be made to prevent it. However, under this invention, there is no need to prevent the occurrence of this transient capacitance since its effect is to reduce the peak current value. Therefore, as stated in the explanation related to formula 17, there is a current flow to supplement the sharp voltage drop in discharge plasma space capacitance Cg that accompanies the beginning of discharge, but this current corresponds to the amount needed to augment the energy injected into the lamp beyond the minimum energy discharge conditions in order to provide a practical light source with the capability for uniform discharge across the full surface of the dielectric-barrier discharge lamp. As stated previously, the injection of energy must be close to the timing for full discharge of the charge stored in the condenser (Cg) formed by the discharge plasma space, preferably overlapping. The transient capacitance can make up a part of current supply to augment the energy injected into the lamp, and there is no need for the current supply from the transient capacitance to the lamp to pass through the step-up transformer, so it is preferably injected with overlapping timing. It is, therefore, a great advantage that in this invention it is possible to make positive use of the existence of this transient capacitance. To pursue this thinking further, it is possible to add a condenser in parallel to the dielectric-barrier discharge lamp to provide an even better dielectric-barrier discharge lamp light source. The capacitance of the added condenser is preferably lower than the dielectric capacitance Cd expressed by formula 17. Now, the reason that the transient capacitance Ce is not included in the expression in formula 17 is that the charge supplied to the lamp from the transient capacitance during discharge is ultimately made up by the transience capacitance from the power supply.

What has been explained up to this point has primarily concerned with the rising voltage at which discharge begins (+Ei) and the lamp voltage value at the beginning of the period of rapid change (VF), with regard to phenomena when the lamp voltage changes from the negative lamp voltage (VA) to the positive lamp voltage (VB), and the effects of those phenomena. Needless to say, the same explanation can be made, with voltage and currency polarity reversed, when the lamp voltage changes from the positive lamp voltage (VB) to the negative lamp voltage (VA).

A brief supplementary explanation regarding the voltage at the beginning of discharge follows. When the effective voltage to begin discharge is the rising voltage at which discharge begins (+Ei), the lamp voltage rises from a low value; when it passes that level discharge begins and eventually ends, but at the point when discharge ends the rising voltage at which discharge begins (+Ei) disappears and is replaced with the falling voltage at which discharge begins (−Ei) as the effective voltage to begin discharge. When the effective voltage to begin discharge is the falling voltage at which discharge begins (−Ei) and the lamp voltage falls from a high value past that point, discharge begins and eventually ends, but at the point when discharge ends the falling voltage at which discharge begins (−Ei) disappears and is again replaced with the rising voltage at which discharge begins (+Ei) as the effective voltage to begin discharge. Now, it is possible for the discharge conditions to have a positive value for the falling voltage at which discharge begins and a negative value for the rising voltage at which discharge begins. When the lamp voltage waveform (Vs(t)) is asymmetrical with respect to reversal of polarity, the absolute values of the rising voltage at which discharge begins and the falling voltage at which discharge begins normally are not the same.

In connection with that, in approximation analyses on the order of phenomena, the charge output from the power supply in the course of discharge was estimated after the lamp voltage changed to VB, but in reality the discharge should begin when the voltage impressed on the lamp reaches the rising voltage at which discharge begins (+Ei) shown in FIGS. 3 and 4. However, it should be added that this is an analytical technique to get a comprehensive understanding of phenomena that occur between the initial state and the final state of the short time period Δt between the point just prior to the beginning of discharge and the point when the lamp voltage reaches VB after the completion of discharge; the fine differences of timing are not important.

Next, a configuration for implementation of the invention is explained with reference to FIG. 5.

The DC voltage (Vi) from a DC voltage source (12) is converted to a higher DC voltage (Vj) by a chopper circuit (26) with a step-up function, the circuit using a switch element with an FET or similar device. The chopper circuit output voltage (Vj) is supplied to the inverter circuit (13). The inverter circuit (13), which uses a switch element with an FET or similar device, converts the output voltage (Vj) of the chopper circuit to alternating current (31) and feeds it to the primary side of a step-up transformer (10), thus producing a high-voltage, alternating current output (Vs) from the secondary side of the step-up transformer (10). This output (Vs) is used to turn on the dielectric-barrier discharge lamp (2). At that point the inverter gate signal generator circuit (29) produces gate signals (GU, GL), which control the switch element of the inverter circuit so that the alternating current (31) has the desired frequency and duty cycle. In addition, the chopper gate signal generator circuit (30) generates a gate signal (Gc) that controls the DC voltage (Vj) fed to the inverter circuit (13).

The working of the chopper circuit (26) of the power supply for the dielectric-barrier discharge lamp light source of this invention is described next. The voltage impressed on the lamp of the dielectric-barrier discharge lamp is a high voltage, as expressed by formulas 4 and 5, and so a step-up transformer (10) is necessary. The secondary output (Vs) of this step-up transformer can be made as high as desired by using a step-up transformer with a large step-up ratio, but in reality, doing so will bring about a high primary-secondary leakage inductance value in the step-up transformer (10), and will make it impossible to maintain a sharp change in lamp voltage in the period from just prior to the beginning of discharge until the peak voltage value is reached following completion of discharge, as described above, so as not to reduce the efficiency of excimer light generation. It is known that from this perspective of sharp change, the smaller the step-up ratio of the step-up transformer (10) is, the better; there are limits to how great the ratio can be. The voltage value of the DC voltage source (12) changes in accordance with the environment of the location where the dielectric-barrier discharge lamp light source power supply is installed. For example, if the DC voltage source (12) is supplied to the dielectric-barrier discharge lamp light source power supply from the outside, the voltage value of the DC voltage source (12) will often be 24 V or ±15 V. Also, there are occasions when AC 100 V is supplied, then rectified to DC 140 V or doubled to DC 280 V within the dielectric-barrier discharge lamp light source power supply. In any case, the step-up ratio of the step-up transformer (10) is large. Even though from the perspective of a sharp change of lamp voltage the step-up ratio of the step-up transformer (10) should be held to an appropriate value that is not too large, it is possible to obtain the desired voltage value from the secondary side output (Vs) by designing the step-up capabilities of the chopper circuit (26) to make up for deficiencies in the step-up ratio of the step-up transformer (10).

The step-up capability of the chopper circuit (26) is determined by the pulse width of the gate signal (Gc) provided to its switch element. It is also possible to determine the step-up capability of the chopper circuit (26) by means of the duty cycle ratio if the frequency of the gate signals (Gc) can be set.

In general circuit applications, when a chopper circuit is included as the first stage of an inverter circuit the frequency of the chopper circuit is often considerably higher than the frequency of the inverter circuit. That is because frequent charging of the chopper circuit makes up for the drop in smoothing condenser voltage that accompanies the circuit load, which is the charge output to the inverter circuit, and by that means the smoothing condenser voltage is controlled to approximate DC voltage. Therefore, the higher the frequency of the chopper circuit is, the more ripple is reduced and precision when viewed as DC voltage is improved. And so, in the case of a general inverter circuit, if the chopper circuit ripple in the smoothing condenser voltage is great and precision is poor when viewed as DC voltage, that will show up in the subsequent stage of the inverter circuit and have an adverse effect in regard to fluctuations in the power supplied.

Accordingly, in such a case, it is necessary to have separate gate signal generation circuits, with different frequencies, for the chopper circuit and the inverter circuit. This is without question a problem in terms of increased cost.

When the final load is a dielectric-barrier discharge lamp, however, there is no need to reduce chopper circuit ripple because, as stated above, there is no constraint on the waveform of the voltage impressed on the lamp in the period from the end of one discharge to the beginning of the next discharge.

As previously noted, however, the speed of change of lamp voltage in the period from just before discharge begins until the peak voltage is reached after discharge begins must be sharp enough that it will not inhibit the efficiency of excimer light generation, and because the size of the peak voltage value is directly related to the energy injected into the lamp by one discharge, the lamp voltage waveform in the period from just before discharge begins until the peak voltage is reached after discharge begins must be reproducible repeatedly for stability of operation.

Accordingly, in the event that chopper circuit ripple is not reduced, it is necessary and sufficient to synchronize the gate drive of the chopper circuit and the inverter circuit. This fact can be put to good use in devising the load characteristics of the dielectric-barrier discharge lamp, which is one point of superiority of this invention.

Figure 5:
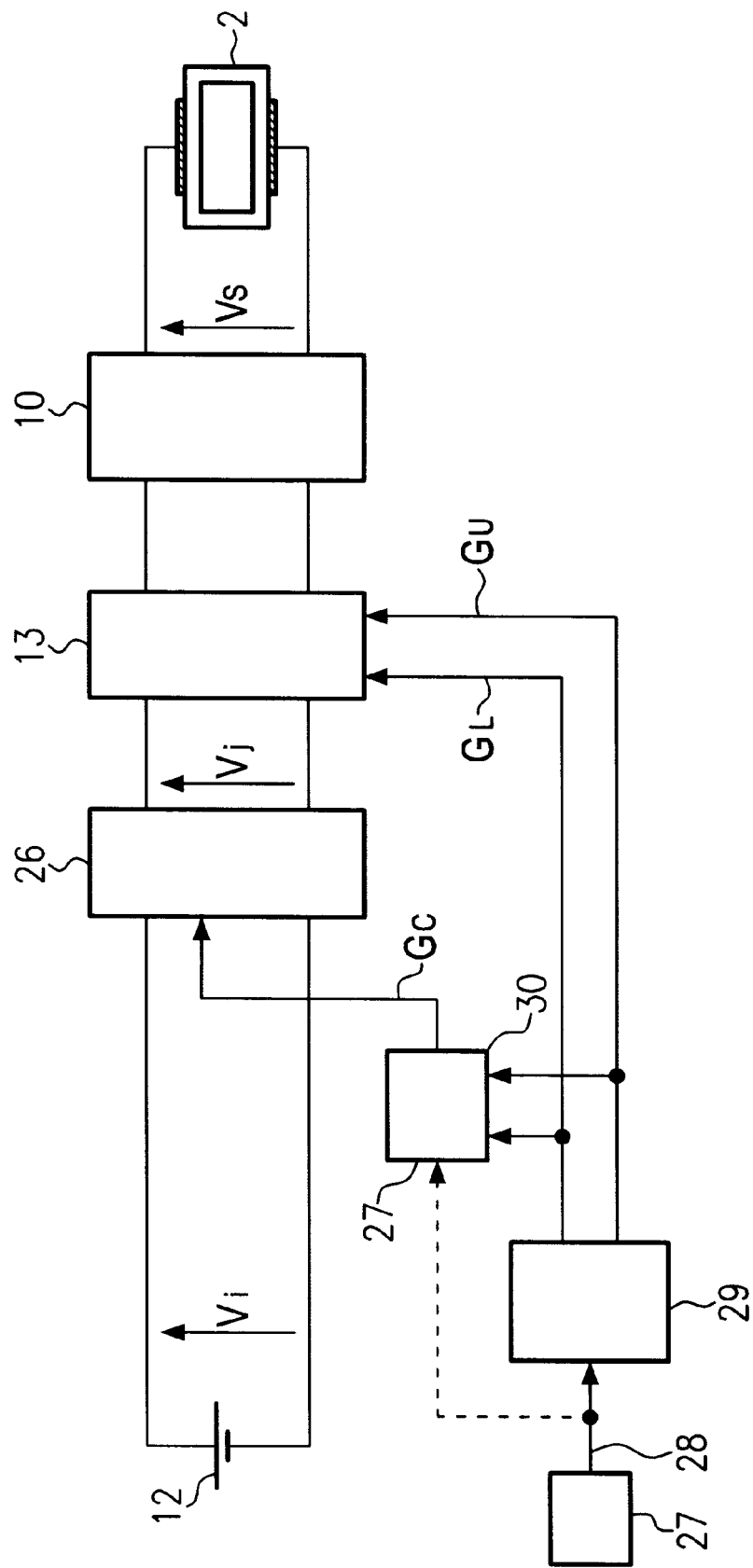
FIG. 5 is a block diagram of the dielectric-barrier discharge lamp light source power supply in accordance with one embodiment of the present invention.

In FIG. 5 there is an oscillator circuit (27) to set the operating frequency of the inverter circuit (13); the oscillator signal (28) from the oscillator circuit (27) is input to the inverter gate signal generation circuit (29). The gate signals (GU, GL) output by this inverter gate signal generation circuit (29) are input to the inverter circuit (13) and are input to the chopper gate signal generation circuit (30) as well. The chopper gate signal generation circuit (30) acting on the basis of the inverter circuit gate signals (GU, GL), produces a chopper circuit gate signal (Gc). Because of this structure, the chopper circuit gate signal (Gc) that controls the switch element of the chopper circuit (26) is produced in reliable synchronization with the inverter circuit gate signals (GU, GL).

Another possibility, instead of having the inverter circuit gate signals (GU, GL) input to the chopper gate signal generation circuit (30), is to have the oscillator signal (28) from the oscillator circuit (27) input to the chopper gate signal generation circuit (30). Then the chopper gate signal generation circuit (30), acting on the basis of the oscillator signal (28), produces the chopper circuit gate signal (Gc); the chopper circuit gate signal (Gc) that controls the switch element of the chopper circuit (26) is produced in reliable synchronization with the inverter circuit gate signals (GU, GL).

Thus, the dielectric-barrier discharge lamp light source power supply of this invention with the structure shown in FIG. 5 has a chopper circuit (26) as the first stage of its inverter circuit (13). As stated above, the step-up ratio of the step-up transformer (10) is held to an appropriate value that is not too large, in line with the perspective that the speed of change of lamp voltage in the period from just before discharge begins until the peak voltage is reached after discharge begins must be sharp enough that it will not inhibit the efficiency of excimer light generation, but even so, the chopper circuit (26) is designed so that its step-up capability makes up for inadequacies in the step-up ratio of the step-up transformer (10), and so the desired voltage value of the secondary output (Vs) is easily realized. Because of that, this invention is effective in resolving the first problem stated above.

There is an effect in resolving the first problem because it is possible to use only a single oscillator circuit (27). Moreover, the chopper circuit gate signal (Gc) to control the switch element of the chopper circuit (26) is produced in reliable synchronization with the inverter circuit gate signals (GU, GL), and by this means, since the size of the peak voltage value is directly related to the energy input to the lamp by one discharge, the lamp voltage waveform in the period from just before discharge begins until the peak voltage is reached after discharge begins is reproducible repeatedly, satisfying the conditions for stability of operation.

Next, another configuration for implementation of the invention is explained. The configuration of implementation of the invention uses the power supply described in FIG. 5 to produce the lamp voltage waveform (Vs(t)) described in FIG. 4, and turns on the dielectric-barrier discharge lamp (2). Accordingly, this dielectric-barrier discharge lamp light source has the superior effects of the dielectric-barrier discharge lamp light source described above, as well as the superior effects of the dielectric-barrier discharge light source power supply as also described above.

That is, in regard to realization of a sharp rise of lamp voltage, even if the step-up ratio of the step-up transformer (10) is held to an appropriate value that is not too large, the step-up ratio of the chopper circuit (26) is designed to make up for inadequacies in the step-up ratio of the step-up transformer (10), so that it is possible to achieve secondary side output of the desired voltage value. It is also possible to set the lamp voltage at the beginning of the rapid change (VF) at a value lower than the rising voltage at which discharge begins (+Ei). Because the speed of change of lamp voltage in the period from just before discharge begins until the peak voltage is reached after discharge begins can be sharp enough that it will not inhibit the efficiency of excimer light generation, there is an effect in resolving the first problem described above.

Moreover, when the lamp voltage waveform (Vs(t)) changes from the negative lamp voltage (VA) to the positive lamp voltage (VB), it changes gradually during that period (A1) before reaching the beginning value (VF) for sharp change of lamp voltage, which has a value lower than the rising voltage at which discharge begins (+Ei). As stated previously, there is a very low charging current flow over a long period in preparation for a sharp shift of charge during discharge, and as a result, it is possible to reduce the peak current value to the switch element in the inverter circuit, and it is possible to use a single oscillator circuit (27) so that there is an effect in resolving the second problem stated above. Moreover, the chopper circuit gate signal (Gc) that controls the switch element of the chopper circuit (26) is produced in reliable synchronization with the inverter circuit gate signals (GU, GL), and by this means, since the size of the peak voltage value is directly related to the energy input to the lamp by one discharge, the lamp voltage waveform in the period from just before discharge begins until the peak voltage is reached after discharge begins is reproducible repeatedly, satisfying the conditions for stability of operation.

Figure 7:
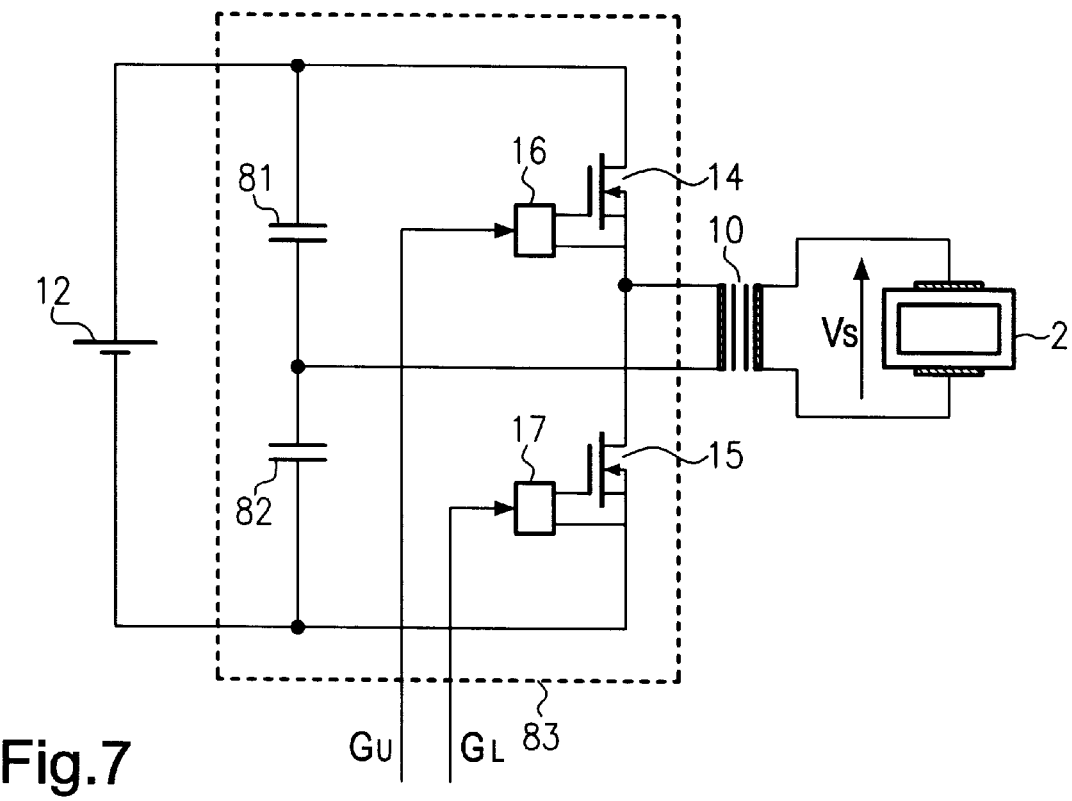
FIG. 7 shows one example of a simplified block diagram of one implementation of the dielectric-barrier discharge lamp light source in accordance with the invention.

Explained below are implementations of the dielectric-barrier discharge lamp light source and power supply that have solved the first problem stated above (the necessity of improving the light efficiency of lamps in order to meet the high interest in reduced power consumption, reduced generation of heat by the lamp, and improved lamp longevity) and the second problem stated above (the need to popularize the use of superior ultraviolet radiation technology by making it more economical). FIG. 7 is a simplified circuit diagram of a circuit using an inverter circuit called a half-bridge, which can be used as the power supply (1) for a dielectric-barrier discharge lamp light source based on of this invention. The inverter circuit is constructed with FETs or similar devices as switch elements (14, 15); the power from a DC power voltage source (12) is converted to alternating current and impressed on the primary side of a step-up transformer (10). The step-up transformer (10) transforms the alternating current to a high voltage and impresses it on a dielectric-barrier discharge lamp (2). The switch elements (14, 15) of the inverter circuit are connected to inverter gate drive circuits (16, 17); the switch elements (14, 15) are each turned on or off in accordance with gate signals (GU, GL).

Figure 6A:
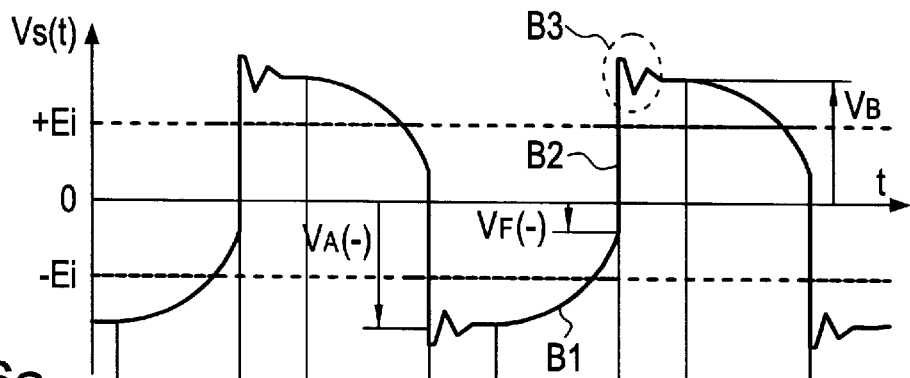
FIG. 6 shows one example of a concept diagram of the waveform in the electrical circuitry of one implementation of the dielectric-barrier discharge lamp light source in accordance with this invention.
Figure 6B:
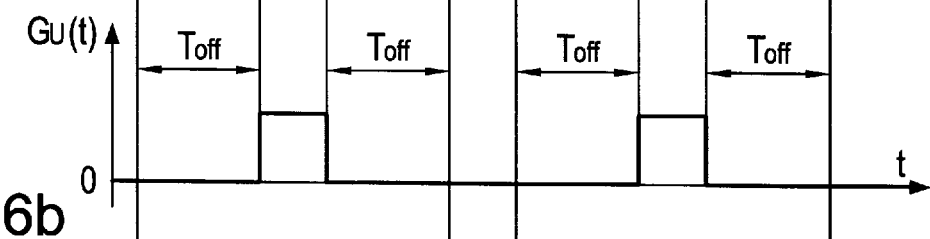
Figure 6C:
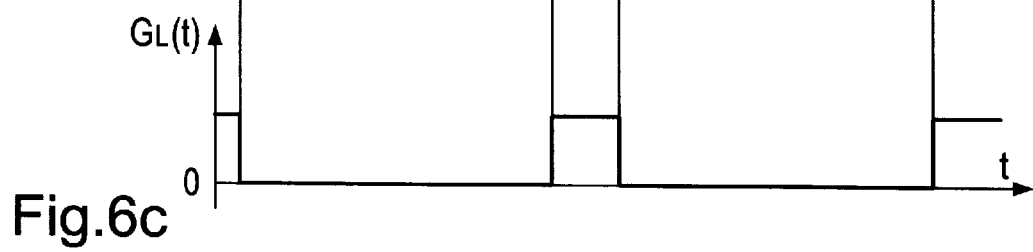

The nature of the gate signals (GU, GL) is shown in FIG. 6 in relation to the lamp voltage waveform (Vs(t)). FIG. 6 records in idealized form that when the gate signals (GU, GL) are at a low level the switch elements (14, 15) connected to them are turned off, and when the gate signals (GU, GL) are at a high level the switch elements (14, 15) connected to them are turned on. The feature of this implementation is that intentionally introducing a period (Toff) when both gate signals—gate signal GU and gate signal GL—are at a low level produces a period of gradual change (B1) in the lamp voltage waveform (Vs(t)).

The reason for intentionally introducing a period (Toff) when both gates are at a low level to produce a period of gradual change (B1) in the lamp voltage waveform (Vs(t)) is explained below. As stated above, in the dielectric-barrier discharge lamp the dielectrics (6, 7) are structured to cause current to flow by acting as condensers, and basically they are condensers. That is, during the period (Toff) when both gates are at a low level, the dielectric-barrier discharge lamp is already in a non-discharge state, and so the discharge switch (Swg) in FIG. 2 is open; the dielectric-barrier discharge lamp (2) as a whole is equivalent to a quasi-condenser with the capacitance of dielectric capacitance Cd in series with discharge plasma space capacitance Cg and the combination in parallel with transient capacitance Ce.

$$Coff=CdCg/(Cd+Cg)+Ce \qquad \text{formula 36}$$

Then, a little after the start of the period (Toff) when the two gate signals are at a low level, the primary side of the step-up transformer (10) is opened. Because of that, the inductance Ls of the secondary side of the step-up transformer and the non-discharge lamp capacitance Coff enter a free LC resonant state, starting a period of gradual change (B1) of the lamp voltage waveform as a portion of a sine wave resulting from resonance. In connection with that, the proportion of lamp voltage waveform cycle time T occupied by the period (Toff) when both gates are at a low level, which is Toff/T, is equal to the proportion ($\alpha$) of the cycle occupied by the period of gradual change.

Accordingly, it is necessary to constitute the light source by adjusting the values of the parameters inductance Ls of the secondary side of the step-up transformer, non-discharge lamp capacitance Coff, lamp voltage waveform cycle time (T) and period (Toff) when both gate signals are at a low level, so as to give the desired value to $\Delta Vy/\Delta Vx$.

Of those parameters, the non-discharge lamp capacitance Coff is determined almost entirely by the constitution of the lamp. The lamp voltage waveform cycle time (T) is a quantity that correlates directly with the power injected into the lamp, and from the perspective of core loss there is not much range for adjustment. Although there are limits, from the perspective of core loss, regarding the value of the inductance Ls of the secondary side of the step-up transformer, the degree of freedom of adjustment is relatively great. As for the period (Toff) when both gate signals are at a low level, and that is because it relates to the proportion ($\alpha$) of the cycle occupied by the period of gradual change, as stated above. Accordingly, achievement of the desired value of $\Delta Vy/\Delta Vx$ is realized mainly through a combination of the inductance Ls of the secondary side of the step-up transformer and the period (Toff) when both gate signals are at a low level. Now, setting the value of the period (Toff) when both gate signals are at a low level can be done by variable adjustment or automatic feedback adjustment, either of which are easily built into the power supply.

In connection with this, generally for inverter circuits like that of FIG. 7 there is known technology for controlling the power to the load by increasing or decreasing the duty cycle; this is known as pulse width modulation (PWM). But as stated above, the dielectric-barrier discharge lamp has a constitution that causes a current flow because of the function of the dielectrics (6, 7) as a condenser, and because the lamp as a whole is basically a condenser, there is an impulse current that flows only at the instant of rise or fall of the lamp voltage, so that it is not possible to control the power of dielectric-barrier discharge lamps in that way. The fact that it is possible to make skillful use of the freedom of setting the value of the period (Toff) when both gate signals are at a low level, as stated above, is one point of superiority in this invention.

Now, following the period of gradual change (B2) in the lamp voltage waveform (Vs(t)), there is the portion (B3) just before, during and after discharge, which is extremely complex. In this period the primary side of the step-up transformer (10) is connected to a DC power source (12) with low inductance by the switch elements (14, 15), setting up an LC resonant state between the primary-secondary leakage inductance value of the step-up transformer (10) and the capacitance of the dielectric-barrier discharge lamp. But, generally the primary-secondary leakage inductance value of the step-up transformer (10) is designed to be low, and so the resonant frequency is high. In addition, from the time that discharge begins to the time it ends, the discharge switch (Swg) is closed and so the capacitance of the dielectric-barrier discharge lamp is a different value than shown in formula 36. Another source of complexity is the fact that the value of the discharge resistance (Rg) changes during that time. Moreover, closing the discharge switch sharply reduces the voltage of the discharge plasma space (3), and the accompanying flow of current from the step-up transformer (10) is another point of complex behavior. Sometimes a complex ringing waveform occurs in this part of the waveform. Therefore, the discharge portion (B3) of the lamp voltage waveform in FIG. 6 will be described in conceptual terms, and not taken up in detail.

Now with regard to the occurrence of the ringing waveform, the higher peak voltage at which the ringing converges can be ignored in evaluation of the value of $\Delta Vy/\Delta Vx$. That is because ringing is an inevitable phenomenon in circuits that include induction components like transformers and capacitor components like dielectric-barrier discharge lamps and thus have sharp transitional processes, but the point of this invention is not to reduce the inevitable peak current flow that accompanies discharge itself, but to use a very small flow of charge over a long time, during the period of gradual change of lamp voltage, to prepare for a sharp charge transition during discharge, thus having the effect of reducing the components of peak current that are not inevitable. Accordingly, the voltages VA and VB at the completion of discharge can be thought of as simply the voltages on which this ringing converges.

Figure 8:
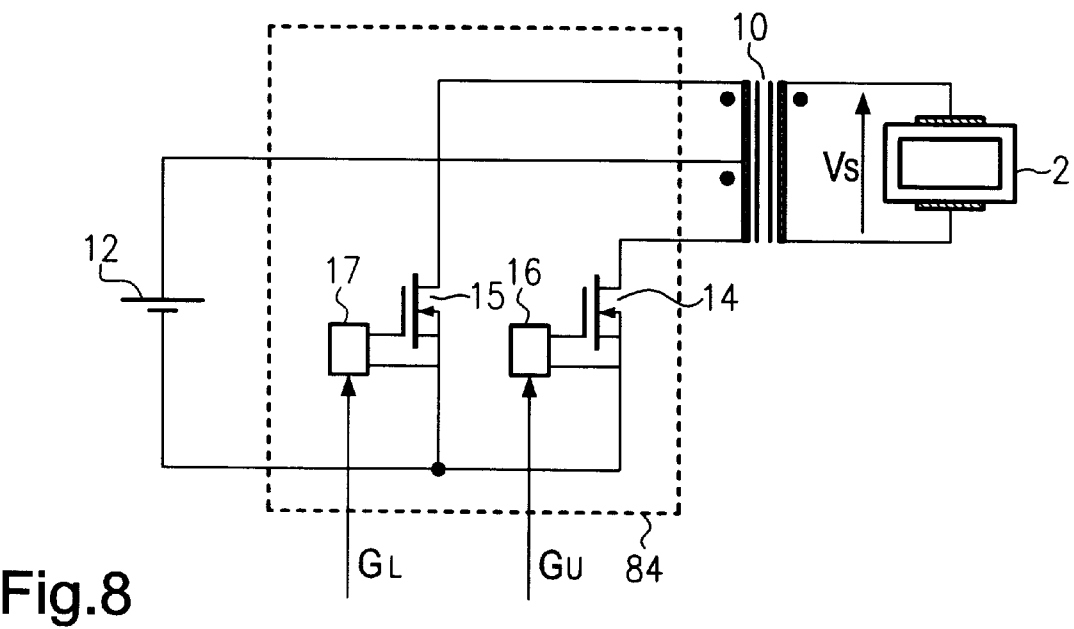
FIG. 8 shows one example of a simplified block diagram of one implementation of the dielectric-barrier discharge lamp light source in accordance with th invention.

FIG. 8 is a simplified circuit diagram of a circuit using an inverter circuit called push-pull, which can be used as the power supply (1) for a dielectric-barrier discharge lamp light source based on this invention. In this constitution, the same gate signals (GU, GL) as described in FIG. 6 can be used as gate signals (GU, GL).

Figure 9:
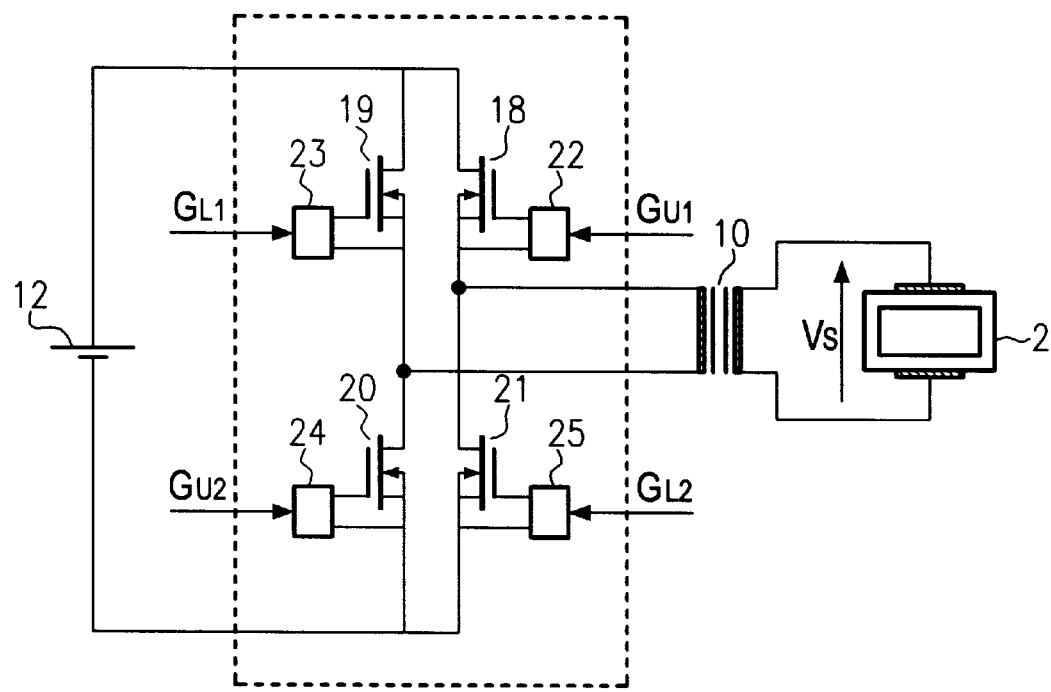
FIG. 9 shows one example of a simplified block diagram of one implementation of the dielectric-barrier discharge lamp light source in accordance with invention.

FIG. 9 is a simplified circuit diagram of a circuit using an inverter circuit called a full-bridge, which can be used as the power supply (1) for a dielectric-barrier discharge lamp light source based on this invention. In this constitution, the inverter circuit switch elements (18, 19, 20, 21) are connected to inverter drive circuits (22, 23, 24, 25), which turn the switch elements (18, 19, 20, 21) on and off in accordance with the gate signals (GU1, GL1, GU2, GL2). The same gate signals (GU, GL) as described in FIG. 6 can be used as gate signals (GU1, GL1, GU2, GL2). Then, the gate signal GU from FIG. 6 is used for the upper right and lower left gate signal pair, and the gate signal GL from FIG. 6 is used for the upper left and lower right gate signal pair (GL1, GL2). In general terms, the time when the upper right and lower left gate signal pair (GU1, GU2) are both at the high level is like gate signal GU and the time when the lower right and upper left gate signal pair (GL1, GL2) are both at the high level is like gate signal GL.

In all the implementations in FIGS. 7, 9 and 8, when the lamp voltage waveform (Vs(t)) changes from the negative lamp voltage (VA) to the positive lamp voltage (VB), there is a period of gradual change (A) until the lamp voltage reaches the beginning value for rapid change (VF) which has a value lower than the rising voltage at which discharge begins (+Ei), and so during the period in which the lamp voltage changes gradually, there is a very small current flow over a long time, to prepare for the sudden shift of charge during discharge. As a result, the peak current value for the switch elements of the inverter circuit is reduced, which has an effect in resolving the second problem stated above. Because the beginning value for rapid change (VF) is set at a value lower than the rising voltage at which discharge begins (+Ei), the speed of change of lamp voltage in the period from just before discharge begins until the peak voltage is reached after discharge begins is sharp enough that it will not inhibit the efficiency of excimer light generation, so there is an effect in resolving the first problem described above.

Now, FIGS. 7, 9 and 8 describe different types of inverter circuits, but it is possible to use other inverter types, including those with a single switch element.

Figure 10:
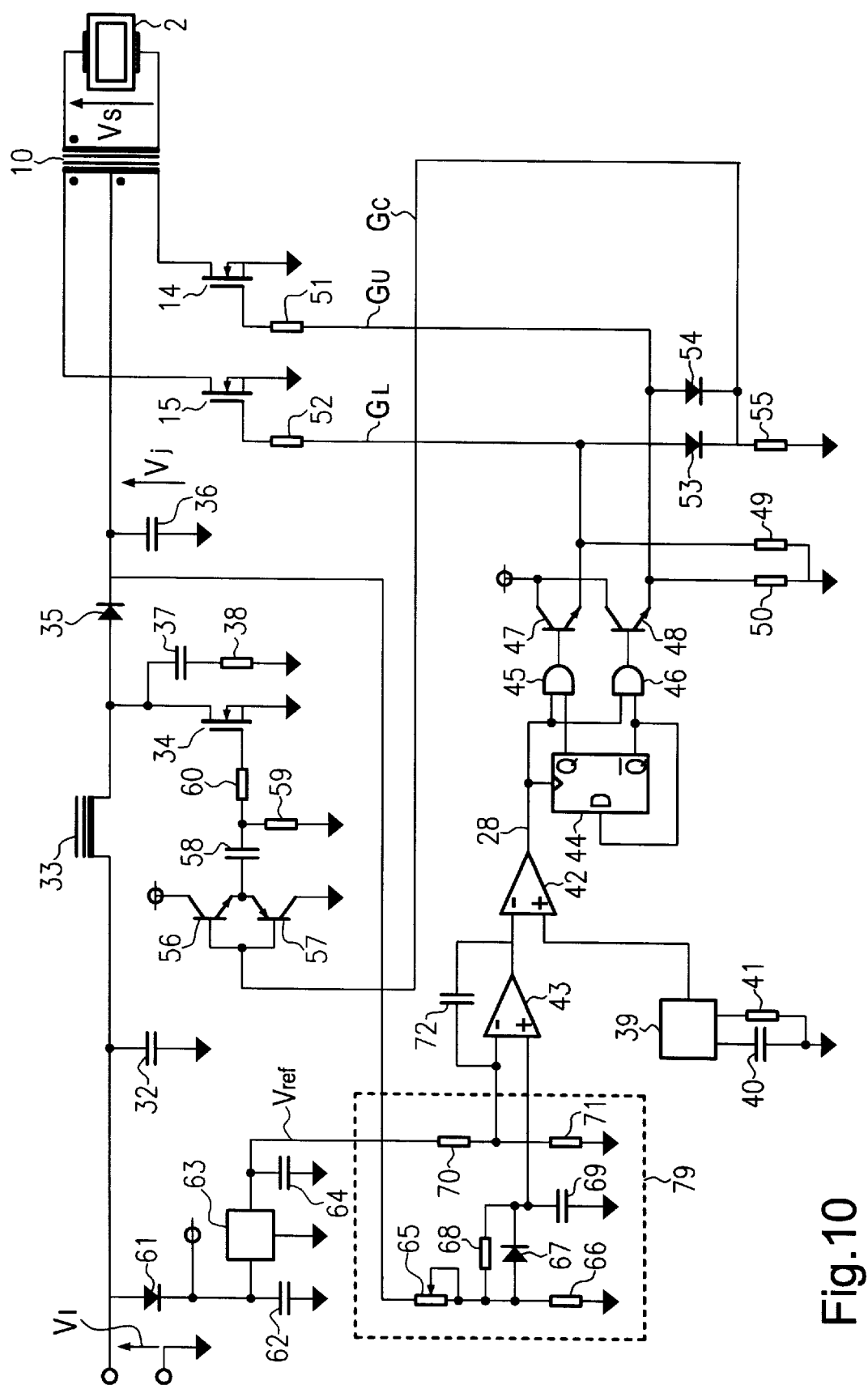
FIG. 10 shows one example of a simplified block diagram of one implementation of the dielectric-barrier discharge lamp light source power supply in accordance with one embodiment of the present invention.

FIG. 10 is a simplified circuit diagram of a dielectric-barrier discharge lamp light source based on this invention.

In FIG. 10, the DC voltage source for DC voltage (Vi) is supplied from the outside. A condenser (32) is mounted in the DC voltage source, which is connected through a choke coil (33) to an FET or other switch element (34). When the switch element (34) shifts from the on state to the off state, the induced voltage produced in the choke coil (33) passes through a diode (35) as stepped up DC voltage (Vj) and is accumulated in a smoothing condenser (36). In connection with this, the choke coil (33), switch element (34), diode (35) and smoothing condenser (36) make up a chopper circuit known as a step-up chopper circuit. The switch element of the chopper circuit can have a snubber circuit, consisting of a condenser (37) and resistor (38), to absorb surges.

In FIG. 10, the inverter circuit comprising FETs or other switch elements (14, 15) and a step-up transformer (10) is the same as the push-pull inverter described in above. The chopper circuit output voltage (Vj) is connected to a mid-range tap on the primary side of the step-up transformer (10) that is designed so that the speed of change of lamp voltage in the period from just before discharge begins until the peak voltage is reached after discharge begins is sharp enough that it will not inhibit the efficiency of excimer light generation.

The output of the sawtooth oscillator circuit (39) which generates a sawtooth waveform with a frequency that depends on the values of the condenser (40) and resistor (41) is input to the input terminal on one side of a voltage comparator (42). The other input terminal of the voltage comparator receives the output signals from an operational amplifier. The output of the voltage comparator is a square-wave oscillator signal (28) of which the duty cycle has been modulated in accordance with the voltage height relationship of the output signals from the sawtooth oscillator circuit (39) and the operational amplifier (43).

The oscillator signal (28) from the voltage comparator (42) is input to an inverter gate signal generation circuit that comprises a flip-flop device (44), logic circuits (45, 46), transistors (47, 48) and resistors (49, 50), where it produces the inverter circuit gate signals (GU, GL). The inverter circuit gate signals (GU, GL) pass through resisters (51, 52) to the control terminals of the inverter circuit switch elements (14, 15); that is, they are input to the gate terminals.

The chopper gate signal generation circuit, on the other hand, uses a signal adder that comprises diodes (53, 54) and a resistor (55). The inverter circuit gate signals (GU, GL) are input to it, producing the chopper circuit gate signal (Gc). Now, the method of generating chopper circuit gate signals from the signal adder is the simplest of the methods of producing a chopper circuit gate signal (Gc) that is synchronized with the inverter circuit gate signals (GU, GL). The chopper circuit gate signal (Gc) passes through a buffer circuit made of transistors (56, 57), through a differentiating circuit comprising a condenser (58) and a resistor (59), and through a resistor (60) to the control terminal of the chopper circuit switch element (34); that is, the signal is input to the gate terminal. Because the buffer circuit is made of transistors (56, 57) and the differentiating circuit comprising a condenser (58) and a resistor (59) are added for the purpose of reducing the off-time losses that the chopper circuit switch element (34) tends to generate; it can be omitted if it is not necessary. The inverter circuit switch elements (14, 15), on the other hand, do not generate many off-time losses, so it is not necessary to add a special gate drive circuit, but similarly, if found necessary it is preferable that a buffer circuit similar to the buffer circuit made of transistors (56, 57).

FIG. 12 is a conceptual representation of the relationships among the inverter circuit switch elements (14, 15), the chopper circuit gate signal (Gc), the choke coil (33) current (IL), the chopper circuit output voltage (Vj), and the lamp voltage waveform (Vs(t)). A simple explanation of that figure follows.

As shown in FIG. 12, when either of the two inverter circuit gate signals (GU, GL) is at a high level, the chopper circuit gate signal (Gc) will be at a high level. For that reason, the frequency of the chopper circuit gate signal (Gc) is the frequency of circuit operation; that is, it is double the frequency of the inverter circuit switch elements (14, 15). When the chopper circuit gate signal (Gc) is at a high level, the chopper circuit switch element (34) is turned on, increasing the current in the choke coil (33); magnetic energy is accumulated in the choke coil (33). When the chopper circuit gate signal (Gc) is at a low level, the chopper circuit switch element (34) is turned off and the current (IL) of the choke coil (33) diminishes, so that the magnetic energy accumulated in the choke coil (33) is stored in the smoothing condenser as electrical energy.

In the inverter circuit, on the other hand, when either of the two inverter circuit gate signals (GU, GL) is at a high level, the corresponding one of the two inverter circuit switch elements (14, 15) will be turned on, and the lamp voltage waveform (Vs(t)) on the secondary side of the step-up transformer (10) will change sharply in the direction of reversing polarity, and a discharge will occur in the dielectric-barrier discharge lamp (2). As stated previously, the dielectric-barrier discharge lamp is so constituted that current flows because the dielectrics (6,7) function as a condenser and the lamp as a whole is basically a condenser, so immediately after either of the two inverter circuit switch elements (14, 15) is turned on, there is a pulsed current flow in the switch element and the lamp, but there is no significant current flow in the lamp after discharge is completed.

Accordingly, even if one of the two inverter circuit switch elements (14, 15) is turned on, the only current flow in the switch element is the current that increases slowly, depending on the size of the inductance on the primary side of the step-up transformer (10), which is known as exciting current. This is extremely small compared with the pulsed current that flowed immediately after the inverter circuit switch element was turned on. That is, following completion of the pulsed current that flows immediately after the inverter circuit switch element is turned on, there is little load flowing from the smoothing condenser (36) and so the chopper circuit output voltage (Vj) is almost unchanged. This situation is shown in FIG. 12, where the chopper circuit output (Vj) steps down and remains almost unchanged, when either of the two inverter circuit gate signals (GU, GL) is at a high level.

When the inverter circuit gate signal returns from a high level to a low level, the chopper circuit output voltage (Vj) climbs because the chopper circuit switch element (34) turns off and the smoothing condenser (36) fills up. At this time, both inverter circuit switch elements (14, 15) are in the off state, and so there is no sign of chopper circuit output voltage (Vj) ripple or variation in the lamp voltage waveform (Vs(t)) as a result of the chopper circuit filling the smoothing condenser (36).

As is clear from the above explanation of FIG. 12, even though the implementation FIG. 10 has an obvious ripple in the chopper circuit output voltage (Vj), it has no adverse effect on the light from the dielectric-barrier discharge lamp, even though a very simple signal adder comprising diodes (53, 54) and a resistor (55) are used as a chopper gate signal generation circuit. The fact that this skillful use of the characteristics of the load of the dielectric-barrier discharge lamp can be made is one point of superiority of this invention.

The implementation in FIG. 10 includes a feedback-stabilization control function for the power injected into the lamp. This is explained briefly below.

With regard to the power supply for the gate signal generation circuit and feedback-stabilization control circuit, the surge effect of the power supply peak current that accompanies operation of the chopper circuit is reduced by a diode (61) and a condenser (62). There is a reference voltage source (63) and a condenser (64) to provide a reference voltage (Vref) for stable operation of the feedback-stabilization control. The chopper circuit output voltage (Vj) is detected as an object of feedback-stabilization control by a rheostat (65) and resistor (66), and after the chopper circuit output voltage (Vj) ripple is eliminated by a peak hold circuit comprising a diode (67), a resistor (68) and a condenser (69), the chopper circuit output voltage (Vj) is input to the non-inverting input terminal of the operational amplifier (43). The output voltage of the reference voltage source (63) is converted to a signal by a voltage divider comprising resistors (70, 71) and input to the inverting input terminal of the operational amplifier (43). So that the operational amplifier (43) can function as an error-integration circuit, a feedback condenser (72) is connected to the output terminal and the inverting input terminal of the operational amplifier.

Because of this circuitry for feedback-stabilization control, in the event that the input voltage to the non-inverting input terminal of the operational amplifier (43) is higher than the input voltage to the inverting input terminal, then the output voltage of the operational amplifier increases, the duty cycle of the oscillation signal (28) from the voltage comparator drops, or in other words the period when both gate signals are at a low level increases and the duty cycle when the chopper circuit switch element (34) is turned on is reduced, and by this means, the chopper circuit output voltage (Vj) is reduced. On the other hand in the event that the input voltage to the non-inverting input terminal of the operational amplifier (43) is lower than the input voltage to the inverting input terminal, then the process is reversed. The DC voltage (Vj) output by the chopper circuit is held steady and as a result the voltage injected into the lamp is controlled at a fixed level by feedback stabilization. Moreover, this sort of feedback-stabilization control function is very effective in the event of fluctuations in the DC voltage (Vi) from the DC voltage source.

Now, the duty cycle of the oscillation signal (28) fluctuates in accordance with the feedback operation, and as a result there are fluctuations in the duty cycle of the inverter circuit switch elements (14, 15). However, this phenomenon of duty cycle fluctuation is no problem at all in regard to the lamp discharge or the power injected into the lamp. That is because the dielectric-barrier discharge lamp is so constituted that the dielectrics (6, 7) act as a condenser and cause a current flow, and the lamp itself is basically a condenser, so that immediately after either of the two inverter circuit switch elements (14, 15) is turned on, there is a pulsed current flow in the switch element and lamp, but after completion of discharge there is no significant current flow in the lamp.

Figure 11:
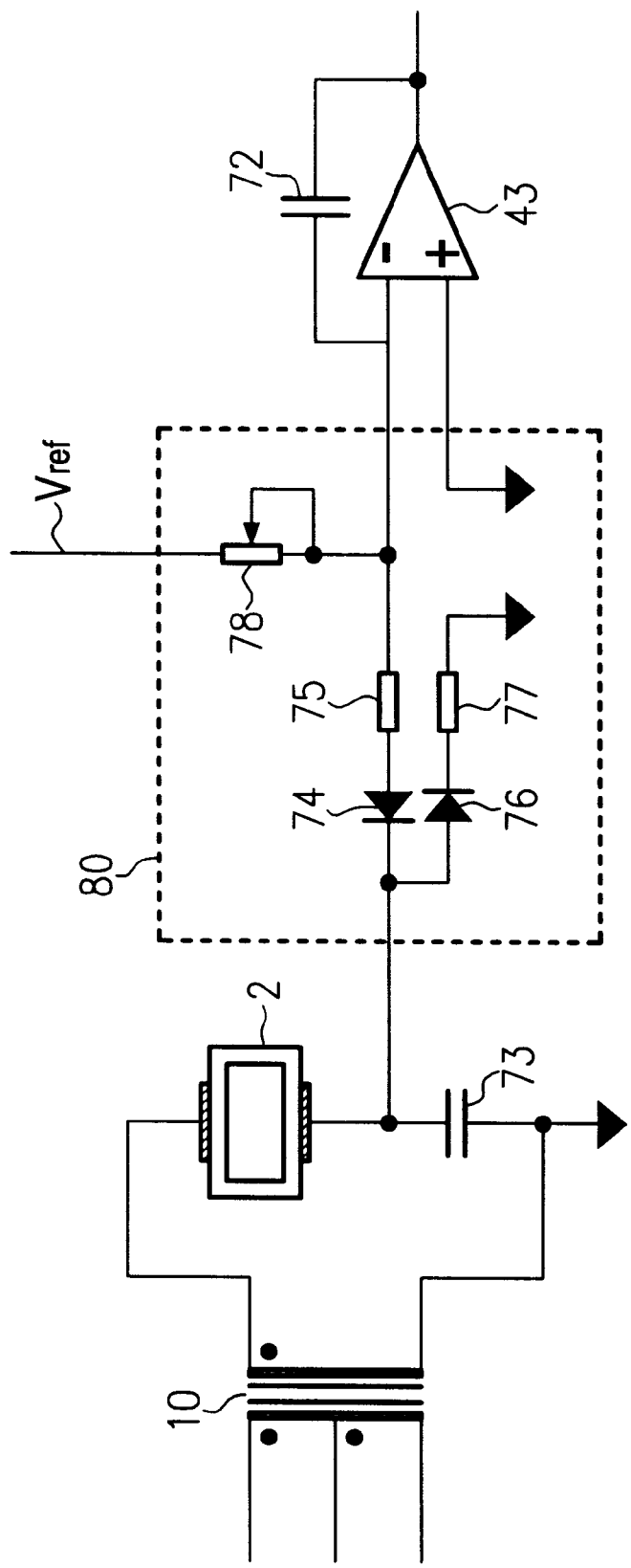
FIG. 11 shows one example of a simplified block diagram of another implementation of the dielectric-barrier discharge lamp light source power supply in accordance with the invention.
Figure 12A:
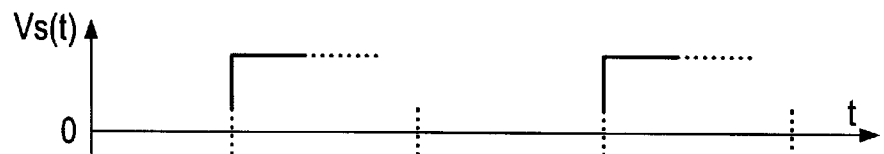
FIG. 12 shows one example of a concept diagram of the waveform in the electrical circuitry of one implementation of the dielectric-barrier discharge lamp light source power supply accordance with the invention.
Figure 12B:
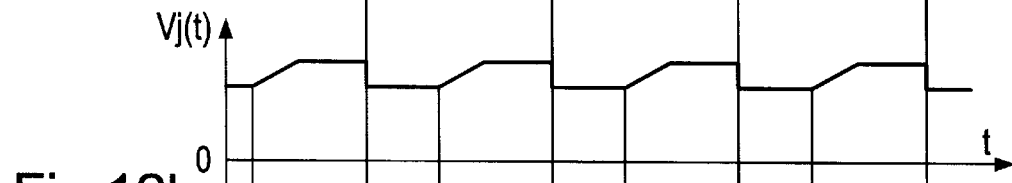
Figure 12C:
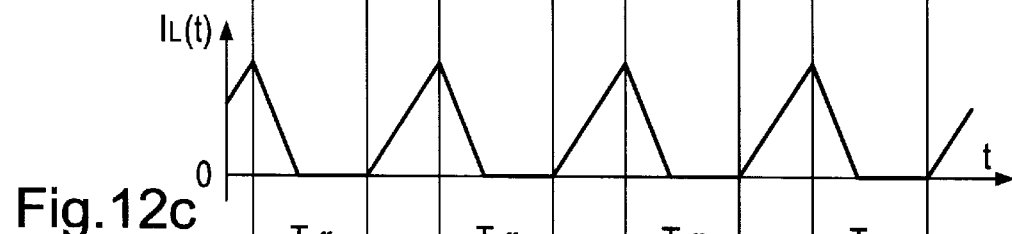
Figure 12D:
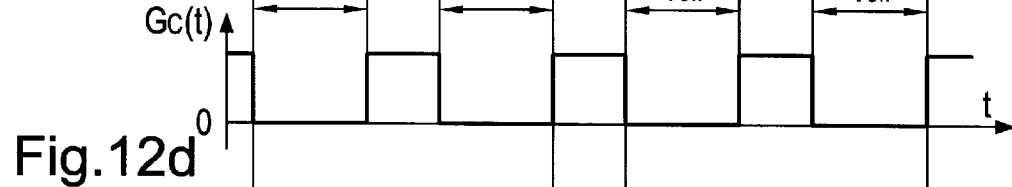
Figure 12E:
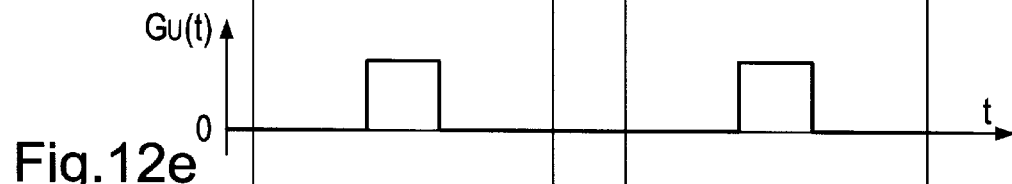
Figure 12F:
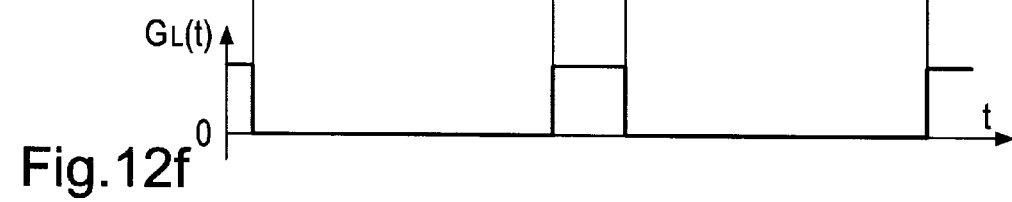

In the implementation in FIG. 10, the DC voltage (Vj) output by the chopper circuit is controlled at a fixed level, but if the circuitry (79) enclosed within the broken line in FIG. 10 is replaced with the circuitry (80) enclosed within the broken line in FIG. 11, it is possible to achieve feedback-stabilization control of the power injected into the lamp by controlling a signal correlated to the current of the dielectric-barrier discharge lamp.

In FIG. 10, a condenser (73) is inserted in the lamp current circuit, and the voltage it produces, as the object of feedback-stabilization control, passes through a diode (74) and a resistor (75) in is input to the inverting input terminal of the operational amplifier (43). A diode (76) and a resistor (77) that do not receive the signal directly maintain the current balance of the signal from the condenser (73); the condenser should be installed for that reason. The increase or decrease of power injected to the lamp is adjusted by a rheostat (78) connected between the reference voltage and the inverting input terminal of the operational amplifier. Now, it is possible to replace the condenser (73) that generates the voltage which the object of feedback-stabilization control with a combination of condensers and resistors, or with an appropriate inductance element, or to devise other ways to obtain a more suitable signal as the object of feedback-stabilization control.

Incidentally, some of the circuit elements use to make up the power supply for the dielectric-barrier discharge lamp light source of the implementation in FIG. 10, including the sawtooth oscillator circuit (39), the voltage comparator (42), the operational amplifier (43), the flip-flop device (44), logic circuits (45, 46), transistors (47, 48) and reference voltage source (63) can be purchased in single packages as integrated circuits (such as Texas Instruments' TL494), and so it is possible to manufacture the dielectric-barrier discharge lamp light source power supply of this implementation with a very small number of parts.

It is clear from the explanation above that in the case of the dielectric-barrier discharge lamp light source power supplies of the implementations in FIGS. 10 and 11, there is a chopper circuit (26) as the first stage of the inverter circuit (13) to control the step-up ratio of the step-up transformer (10) at an appropriate level that is not too large, in line with the perspective that the speed of change of lamp voltage in the period from just before discharge begins until the peak voltage is reached after discharge begins must be sharp enough that it will not inhibit the efficiency of excimer light generation, but even so, the chopper circuit (26) is designed so that its step-up capability makes up for inadequacies in the step-up ratio of the step-up transformer (10), and so the desired voltage value of the secondary output (Vs) is easily realized. Because of that, this invention is effective in resolving the first problem stated above.

Because it is constituted of a very small number of parts, it is effective in resolving the second problem stated above. Moreover, the chopper circuit gate signal (Gc) to control the switch element of the chopper circuit (26) is produced in reliable synchronization with the inverter circuit gate signals (GU, GL), and by this means, since the size of the peak voltage value is directly related to the energy input to the lamp by one discharge, the lamp voltage waveform in the period from just before discharge begins until the peak voltage is reached after discharge begins is reproducible repeatedly, satisfying the conditions for stability of operation, and making it possible to operate the light source with very stable power injected into the lamp.

Now, in the implementation shown in FIG. 10, the inverter circuit is shown using the push-pull method described in FIG. 8, but it is also possible to use the half-bridge method shown in FIG. 7, or the full bridge method shown in FIG. 9, or to use another inverter method that has a single switch element. The method of producing the chopper circuit gate signal (Gc) was shown as a signal adder made up of diodes (53, 54) and a resistor (55), but such things as inversion of the signal adder output or phase shifting are also possible. Moreover, the chopper circuit can take some form other than the step-up chopper circuit shown in FIG. 11, such as the voltage elevator method.

Next, the constitution of a dielectric-barrier discharge lamp light source based on another embodiment of this invention is explained briefly.

In the dielectric-barrier discharge lamp light source power supply shown in FIGS. 10 and 11, the desired value of $\Delta Vy/\Delta Vx$ is obtained by, most simply, introducing a period (Toff) when both the inverter circuit gate signals (GU, GL) are at a low level, after which the non-discharge lamp capacitance Coff is measured as explained by formula 36, and because of the LC resonance phenomenon that produces a sine wave with a frequency determined by the non-discharge lamp capacitance Coff and the inductance Ls on the secondary side of the step-up transformer, the lamp voltage waveform (Vs(t)) becomes as shown in FIG. 6. As a result, the values of the various parameters—the inductance Ls on the secondary side of the step-up transformer and the lamp voltage waveform cycle length (T)—can be adjusted during the period when both gate signals are at a low level, so as to achieve the desired value of $\Delta Vy/\Delta Vx$.

However, when determining the period (Toff) when both gate signals are at a low level in the event of feedback-stabilization control of the lamp injection power by adjustment of the duty cycle when the chopper circuit switch element (34) is turned on, or in other words adjustment of the period (Toff) when both gate signals are at a low level, it is possible to increase or decrease the period (Toff) when both gate signals are at a low level and thus change the value of $\Delta Vy/\Delta Vx$ to keep it within the desired range. To do that, the ratio of the period Toff when both gate signals are at a low level to the lamp voltage waveform cycle length T, or in other words Toff/T, should be a large value, specifically within the range from 50% to 90%.

In any case, to have a large value like 80% means that the part of the duty cycle when the chopper circuit switch element (34) is turned on will be a small value like 20%. Even assuming the presence of feedback-stabilization, control will vary that small value within a range of, for example, −20% to +20%, the variation will not change it beyond the bounds of 16% to 24% of the lamp voltage waveform cycle length (T). Accordingly, the variation will have little effect on the value of $\Delta Vy/\Delta Vx$.

Once the period (Toff) when both gate signals are at a low level is determined, it is possible to determine the inductance of the choke coil (33) from the DC voltage (Vi) of the DC voltage source, the desired chopper circuit output voltage (Vj), and the power injected into the lamp. Alternatively, it can be determined experimentally.

The dielectric-barrier discharge lamp light source constituted in this way will have both the superior effects of the dielectric-barrier discharge lamp light source described and the superior effects of the dielectric-barrier discharge lamp light source power supply described.

That is, in regard to realization of a sharp rise of lamp voltage, even if the the step-up ratio of the step-up transformer (10) is held to an appropriate value that is not too large, the step-up ratio of the chopper circuit (26) is designed to make up for inadequacies in the step-up ratio of the step-up transformer (10), so that it is possible to achieve secondary side output of the desired voltage value. It is also possible to set the lamp voltage at the beginning of the rapid change (VF) at a value lower than the rising voltage at which discharge begins (+Ei). Because the speed of change of lamp voltage in the period from just before discharge begins until the peak voltage is reached after discharge begins can be sharp enough that it will not inhibit the efficiency of excimer light generation, there is an effect in resolving the first problem described above.

Moreover, when the lamp voltage waveform (Vs(t)) changes from the negative lamp voltage (VA) to the positive lamp voltage (VB), it changes gradually during that period (A1) before reaching the beginning value (VF) for sharp change of lamp voltage, which has a value lower than the rising voltage at which discharge begins (+Ei). As stated previously, there is a very low charging current flow over a long period in preparation for a sharp shift of charge during discharge, and as a result, it is possible to reduce the peak current value to the switch element in the inverter circuit, and it is possible to use a single oscillator circuit (27) so that there is an effect in resolving the second problem stated above. Moreover, the chopper circuit gate signal (Gc) that controls the switch element of the chopper circuit (26) is produced in reliable synchronization with the inverter circuit gate signals (GU, GL), and by this means, since the size of the peak voltage value is directly related to the energy input to the lamp by one discharge, the lamp voltage waveform in the period from just before discharge begins until the peak voltage is reached after discharge begins is reproducible repeatedly, satisfying the conditions for stability of operation, and making it possible to operate the light source with very stable power injected into the lamp.

With regard to the items explained above, the circuitry shown in the drawings is of course only an example describing the major essentials. In an actual application, more appropriate parts, if available, can be substituted to improve various functions, or the parts used can be changed as appropriate to different features or limitations, or peripheral elements can be added as necessary.

The superior effects of the dielectric-barrier discharge light source and power supply of this invention are extremely effective, no matter what the application of the light produced by the dielectric-barrier discharge. Aside from use in treatment of materials for chemical reactions which was mentioned above, the invention is particularly effective in such applications as illumination of fluorescent bodies with ultraviolet light, including cases where a fluorescent layer is formed on the inner or outer surface of the sealed glass of the lamp.

The dielectric-barrier discharge lamp light source of this invention is a dielectric-barrier discharge lamp light source with a dielectric-barrier discharge lamp (2) comprising a discharge plasma space (3) filled with a discharge gas in which excimer molecules are formed by dielectric-barrier discharge, and two electrodes (4, 5) to induce a discharge phenomenon in the discharge gas, at least one of which is separated from the discharge gas by dielectrics (6, 7); and with a power supply to impress a roughly cyclical, high-voltage alternating current on the electrodes (4, 5) of the dielectric-barrier discharge lamp; such that when the power supply (1) completed one discharge in the dielectric-barrier discharge lamp (2) and the voltage impressed on the lamp changes toward the next discharge, there is a period of gradual change in the lamp voltage waveform (Vs(t)) before reaching the voltage for the beginning of the next effective discharge (+Ei, −Ei), following which the voltage changes sharply. By this means it is possible to solve the first problem stated above, which is the necessity of improving the light efficiency of lamps in order to meet the high interest in reduced power consumption, reduced generation of heat by the lamp, and improved lamp longevity, and to solve the second problem stated above, which is the need to popularize the use of superior ultraviolet radiation technology by making it more economical.

In another embodiment of the invention, a voltage differential $\Delta Vx$ exists between a voltage VA when one discharge is completed and a voltage VB when the next discharge is completed, as well as a voltage differential $\Delta Vy$ between voltage VA and the voltage VF at the end of the period of gradual change of the voltage impressed on the lamp, so as to satisfy the condition $0.3\ \alpha \Delta Vy/\Delta Vx\ \alpha 0.9$.

Also, the dielectric-barrier discharge lamp light source power supply is a dielectric-barrier discharge lamp light source power supply for the dielectric-barrier discharge lamp (2), which has a discharge plasma space (3) filled with discharge gas in which excimer molecules are formed by dielectric-barrier discharge, and two electrodes (4, 5) to induce a discharge phenomenon in the discharge gas, at least one of which is separated from the discharge gas by dielectrics (6, 7), which power supply impresses a roughly cyclical, high-voltage alternating current on the electrodes (4, 5) of the lamp (2); the power supply comprising a chopper circuit (26) that outputs the voltage of a DC power supply (12) stepped up to a higher DC voltage, a step-up transformer (10) that produces a high-voltage alternating current on its secondary side, and an inverter circuit (13) to convert the output of the chopper circuit (26) to alternating current and feed it to the primary side of the step-up transformer (10); such that the gate signal (Gc) controlling the switch element of the chopper circuit (26) is generated in synchronization with the gate signals (GU, GL) controlling the switch elements of the inverter circuit (13).

Thus, because there is a chopper circuit (26) as the first stage of its inverter circuit (13), as stated above, the step-up ratio of the step-up transformer (10) is held to an appropriate value that is not too large, in line with the perspective that the speed of change of lamp voltage in the period from just before discharge begins until the peak voltage is reached after discharge begins must be sharp enough that it will not inhibit the efficiency of excimer light generation, but even so, the chopper circuit (26) is designed so that its step-up capability makes up for inadequacies in the step-up ratio of the step-up transformer (10), and so the desired voltage value of the secondary output (Vs) is easily realized. Because of that, this invention is effective in resolving the first problem stated above. In addition, there is an effect in resolving the first problem because it is possible to use only a single oscillator circuit (27). Moreover, the chopper circuit gate signal (Gc) to control the switch element of the chopper circuit (26) is produced in reliable synchronization with the inverter circuit gate signals (GU, GL), and by this means, since the size of the peak voltage value is directly related to the energy input to the lamp by one discharge, the lamp voltage waveform in the period from just before discharge begins until the peak voltage is reached after discharge begins is reproducible repeatedly, satisfying the conditions for stability of operation.

Also, the dielectric-barrier discharge lamp light source involved is characterized by the fact that the power supply (1) is the dielectric-barrier discharge lamp light source power supply described.

Thus, in regard to realization of a sharp rise of lamp voltage, even if the the step-up ratio of the step-up transformer (10) is held to an appropriate value that is not too large, the step-up ratio of the chopper circuit (26) is designed to make up for inadequacies in the step-up ratio of the step-up transformer (10), so that it is possible to achieve secondary side output (Vs) of the desired voltage value. It is also possible to set the lamp voltage at the beginning of the rapid change (VF) at a value lower than the rising voltage at which discharge begins (+Ei). Because the speed of change of lamp voltage in the period from just before discharge begins until the peak voltage is reached after discharge begins can be sharp enough that it will not inhibit the efficiency of excimer light generation, there is an effect in resolving the first problem described above. Moreover, when the lamp voltage waveform (Vs(t)) changes from the negative lamp voltage (VA) to the positive lamp voltage (VB), it changes gradually during that period (A1) before reaching the beginning value (VF) for sharp change of lamp voltage, which has a value lower than the rising voltage at which discharge begins (+Ei). As stated previously, there is a very low charging current flow over a long period in preparation for a sharp shift of charge during discharge, and as a result, it is possible to reduce the peak current value to the switch element in the inverter circuit, and it is possible to use a single oscillator circuit (27) so that there is an effect in resolving the second problem stated above. Moreover, the chopper circuit gate signal (Gc) that controls the switch element of the chopper circuit (26) is produced in reliable synchronization with the inverter circuit gate signals (GU, GL), and by this means, since the size of the peak voltage value is directly related to the energy input to the lamp by one discharge, the lamp voltage waveform in the period from just before discharge begins until the peak voltage is reached after discharge begins is reproducible repeatedly, satisfying the conditions for stability of operation, and making it possible to operate the light source with very stable power injected into the lamp.

FIELD OF INDUSTRIAL USE

The dielectric-barrier discharge lamp light source of this invention can be used in such applications as an ultraviolet light source for photochemical reactions.

We claim:

1. A dielectric-barrier discharge lamp light source with a dielectric-barrier discharge lamp, said light source comprising:

a discharge plasma space filled with a discharge gas in which excimer molecules are formed by dielectric-barrier discharge;

two electrodes adapted to induce a discharge phenomenon in said discharge gas, at least one of said two electrodes being separated from said discharge gas by a dielectric; and a power supply means for impressing a substantially cyclical, high-voltage alternating current on said two electrodes of said dielectric-barrier discharge lamp in a manner that, when said power supply means completes a discharge in said dielectric-barrier discharge lamp and the voltage impressed on said dielectric-barrier discharge lamp changes for a subsequent discharge, there is a period of gradual change in a lamp voltage waveform (Vs(t)) before reaching a voltage required for beginning of said subsequent discharge, wherein subsequent to said period of gradual change and prior to reaching the voltage required for beginning of said subsequent discharge, the voltage impressed on said dielectric-barrier discharge lamp by said power supply means changes sharply.

2. A dielectric-barrier discharge lamp light source of claim 1, wherein the voltage impressed by said power supply means satisfies the relationship $0.3 \leq \Delta Vy/\Delta Vx \leq 0.9$; wherein VA is a voltage when one discharge is completed, VB is a voltage when said subsequent discharge is completed, $\Delta Vx$ is a voltage differential between said voltage VA and said voltage VB; and VF is a voltage at an end of said period of gradual change, $\Delta Vy$ defining a voltage differential between said voltage VA and said voltage VF.

3. A dielectric-barrier discharge lamp light source of claim 1, wherein said power supply means comprises:

a chopper circuit that outputs a voltage of a DC power supply stepped up to a higher DC voltage;

a step-up transformer having a primary side and a secondary side, said step-up transformer producing a high-voltage alternating current on said secondary side; and an inverter circuit to convert an output of said chopper circuit to an alternating current and to feed said alternating current to said primary side of said step-up transformer in a manner that a gate signal controlling a switch element of said chopper circuit is generated in synchronization with a plurality of gate signals that control a plurality of switch elements of said inverter circuit to provide a lamp voltage waveform (Vs(t)) which changes sharply before reaching a voltage required for beginning of the discharge.

4. A dielectric-barrier discharge lamp light source of claim 2, wherein said power supply means comprises:

a chopper circuit that outputs a voltage of a DC power supply stepped up to a higher DC voltage;

a step-up transformer having a primary side and a secondary side, said step-up transformer producing a high-voltage alternating current on said secondary side; and an inverter circuit to convert an output of said chopper circuit to an alternating current and to feed said alternating current to said primary side of said step-up transformer in a manner that a gate signal controlling a switch element of said chopper circuit is generated in synchronization with a plurality of gate signals that control a plurality of switch elements of said inverter circuit.

5. A dielectric-barrier discharge lamp light source power supply for a dielectric-barrier discharge lamp with a discharge plasma space filled with a discharge gas in which excimer molecules are formed by dielectric-barrier discharge and two electrodes adapted to induce a discharge phenomenon in said discharge gas, at least one of said two electrodes being separated from said discharge gas by a dielectric, said power supply being adapted to impress a substantially cyclical, high-voltage alternating current on said two electrodes, said power supply comprising:

a chopper circuit that outputs a voltage of a DC power supply stepped up to a higher DC voltage;

a step-up transformer having a primary side and a secondary side, said step-up transformer producing the high-voltage alternating current on said secondary side; and an inverter circuit to convert an output of said chopper circuit to an alternating current and to feed said alternating current to said primary side of said step-up transformer in a manner that a gate signal controlling a switch element of said chopper circuit is generated in synchronization with a plurality of gate signals that control a plurality of switch elements of said inverter circuit.

6. A dielectric-barrier discharge lamp and power supply, said dielectric-barrier discharge lamp having a discharge plasma space filled with a discharge gas in which excimer molecules are formed by dielectric-barrier discharge and two electrodes adapted to induce a discharge phenomenon in said discharge gas, at least one of said two electrodes being separated from said discharge gas by a dielectric, said power supply being adapted to impress a substantially cyclical, high-voltage alternating current on said two electrodes, said power supply comprising:

a chopper circuit that outputs a voltage of a DC power supply stepped up to a higher DC voltage;

a step-up transformer having a primary side and a secondary side, said step-up transformer producing the high-voltage alternating current on said secondary side; and an inverter circuit to convert an output of said chopper circuit to an alternating current and to feed said alternating current to said primary side of said step-up transformer in a manner that a gate signal controlling a switch element of said chopper circuit is generated in synchronization with a plurality of gate signals that control a plurality of switch elements of said inverter circuit.

* * * * *